United States Patent
Miller et al.

(10) Patent No.: US 9,385,549 B2
(45) Date of Patent: Jul. 5, 2016

(54) PORTABLE POWER CHARGER WITH POWER INPUT AND POWER OUTPUT CONNECTION INTERFACES

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud, LLC., Glastonbury, CT (US)

( * ) Notice: Subject to any disclaimer, the term of this patent is extended or adjusted under 35 U.S.C. 154(b) by 112 days.

(21) Appl. No.: 14/220,607

(22) Filed: Mar. 20, 2014

(65) Prior Publication Data
US 2015/0028797 A1    Jan. 29, 2015

Related U.S. Application Data

(60) Provisional application No. 61/803,500, filed on Mar. 20, 2013, provisional application No. 61/865,891, filed on Aug. 14, 2013.

(51) Int. Cl.
*H02J 7/00*  (2006.01)

(52) U.S. Cl.
CPC ............ *H02J 7/0042* (2013.01); *H02J 7/0013* (2013.01); *H02J 7/0054* (2013.01); *H02J 7/0055* (2013.01); *H02J 7/0047* (2013.01); *H02J 7/0068* (2013.01); *H02J 2007/005* (2013.01)

(58) Field of Classification Search
CPC .................. H02J 7/0047; H02J 7/7005; H02J 2007/0047; H02J 2007/005; H02J 2007/00627
USPC .................................. 320/103, 107, 113, 115
See application file for complete search history.

(56) References Cited

U.S. PATENT DOCUMENTS

| | | | | |
|---|---|---|---|---|
| 5,220,269 | A * | 6/1993 | Chen | H02J 7/0042 224/902 |
| 5,829,993 | A | 11/1998 | Wu | |
| 5,847,545 | A * | 12/1998 | Chen | H01R 29/00 307/18 |
| 5,901,056 | A | 5/1999 | Hung | |
| 6,201,370 | B1 * | 3/2001 | Reller | H01M 2/1072 320/107 |
| D456,349 | S | 4/2002 | Chuang | |
| 6,588,243 | B1 * | 7/2003 | Hyatt, Jr. | E05B 47/0002 70/278.1 |
| D478,546 | S | 8/2003 | Andre et al. | |

(Continued)

FOREIGN PATENT DOCUMENTS

KR    2006-0087475 A    8/2006

*Primary Examiner* — M'Baye Diao
(74) *Attorney, Agent, or Firm* — McCormick, Paulding & Huber LLP

(57) ABSTRACT

A portable charger is provided for charging electronic devices from a rechargeable internal battery. To accommodate multiple electronic devices, a portable charger unit is combined with multiple power output connection interfaces for connecting to more than one electronic device, as necessary, including connector cables attached to the charger housing or power connection ports. The charger also includes at least one power input connection interface for recharging the internal battery from an external power source, including an AC wall plug interface and a DC car charger interface, each connected to the charger housing and movable between a retracted, storage position and an extended use position. The power output connector cables can also be stored within storage cavities formed in the charger housing when not in use and extended therefrom for connection with electronic devices in need of recharging. The power connection ports can act as power inputs, power outputs, or both.

14 Claims, 21 Drawing Sheets

(56) References Cited

U.S. PATENT DOCUMENTS

| | | | |
|---|---|---|---|
| 6,894,457 B2 | 5/2005 | Germagian et al. | |
| D509,181 S | 9/2005 | Nellenbach et al. | |
| 7,011,538 B2 | 3/2006 | Chang | |
| D543,940 S | 6/2007 | Hussaini et al. | |
| D574,833 S | 8/2008 | Hussaini et al. | |
| D585,825 S | 2/2009 | Ji | |
| D594,817 S | 6/2009 | Abdallah et al. | |
| D610,094 S | 2/2010 | Ouimette et al. | |
| D616,363 S | 5/2010 | Weng | |
| D618,237 S | 6/2010 | Wang | |
| D628,151 S | 11/2010 | Wegener et al. | |
| D628,152 S | 11/2010 | Fujii et al. | |
| D628,153 S | 11/2010 | Fujii et al. | |
| D628,535 S | 12/2010 | Cheng | |
| 7,893,657 B2 | 2/2011 | Chavakula | |
| D636,725 S | 4/2011 | Levy et al. | |
| 7,942,691 B1 | 5/2011 | McSweyn | |
| D641,695 S | 7/2011 | Wegener et al. | |
| D656,096 S | 3/2012 | Sasada et al. | |
| D659,094 S | 5/2012 | Brand et al. | |
| D662,050 S | 6/2012 | Tien | |
| D663,685 S | 7/2012 | Yang | |
| D667,788 S | 9/2012 | Mai | |
| D672,309 S | 12/2012 | Tien | |
| D674,748 S | 1/2013 | Ferber et al. | |
| D675,988 S | 2/2013 | Levy et al. | |
| 8,378,625 B2* | 2/2013 | Gourley | H02J 7/02 248/126 |
| D680,063 S | 4/2013 | Sasada | |
| D682,196 S | 5/2013 | Leung | |
| D682,197 S | 5/2013 | Leung | |
| D686,153 S | 7/2013 | Qu | |
| 8,491,330 B2 | 7/2013 | McSweyn | |
| D697,867 S | 1/2014 | Weinstein et al. | |
| D702,632 S | 4/2014 | Salmon | |
| D783,785 | 9/2014 | Tehrani | |
| 2004/0085694 A1 | 5/2004 | Germagian et al. | |
| 2007/0126290 A1 | 6/2007 | Jaynes et al. | |
| 2007/0247105 A1* | 10/2007 | Krieger | H02J 7/0006 320/104 |
| 2008/0174265 A1* | 7/2008 | Toya | H02J 7/0042 320/107 |
| 2008/0238356 A1* | 10/2008 | Batson | H02J 7/0045 320/103 |
| 2008/0284371 A1 | 11/2008 | Hsu | |
| 2008/0303481 A1* | 12/2008 | Silverbrook | B41J 3/445 320/115 |
| 2009/0267562 A1* | 10/2009 | Guccione | H02J 7/0054 320/114 |
| 2009/0278406 A1* | 11/2009 | Hoffman | H02J 7/0054 307/66 |
| 2010/0109602 A1 | 5/2010 | Chang et al. | |
| 2011/0009824 A1* | 1/2011 | Yodfat | A61M 5/14248 604/151 |
| 2011/0148344 A1* | 6/2011 | Manor | H02J 7/0054 320/103 |
| 2011/0187323 A1* | 8/2011 | Gourley | H02J 7/02 320/111 |
| 2012/0166697 A1 | 6/2012 | Hu et al. | |
| 2012/0187902 A1 | 7/2012 | Wang | |
| 2012/0238132 A1 | 9/2012 | McSweyn | |
| 2012/0268064 A1* | 10/2012 | Ostrom | G06F 1/26 320/108 |
| 2013/0193911 A1 | 8/2013 | Miller et al. | |
| 2014/0152257 A1* | 6/2014 | Miller | H02J 7/0042 320/111 |

* cited by examiner

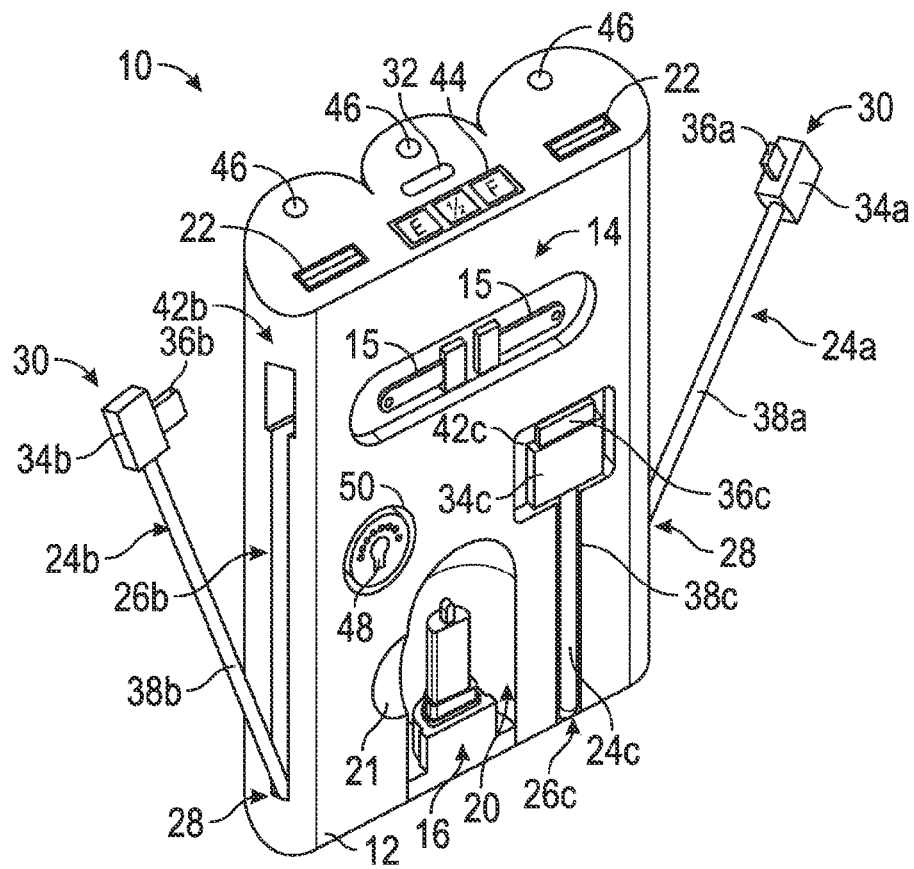
FIG. 4
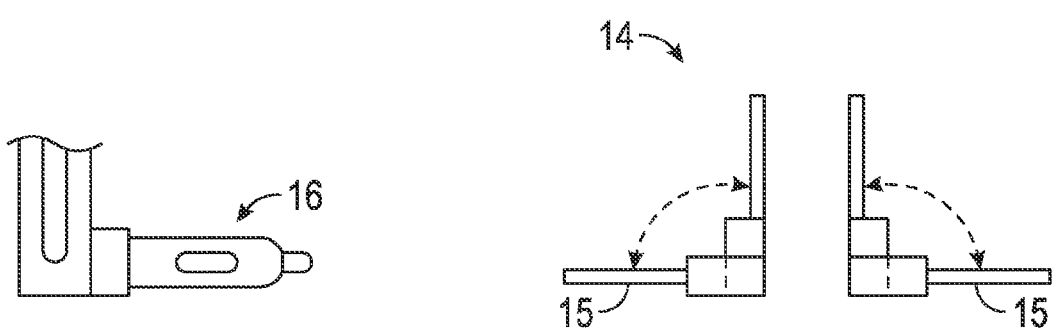
FIG. 5
FIG. 6

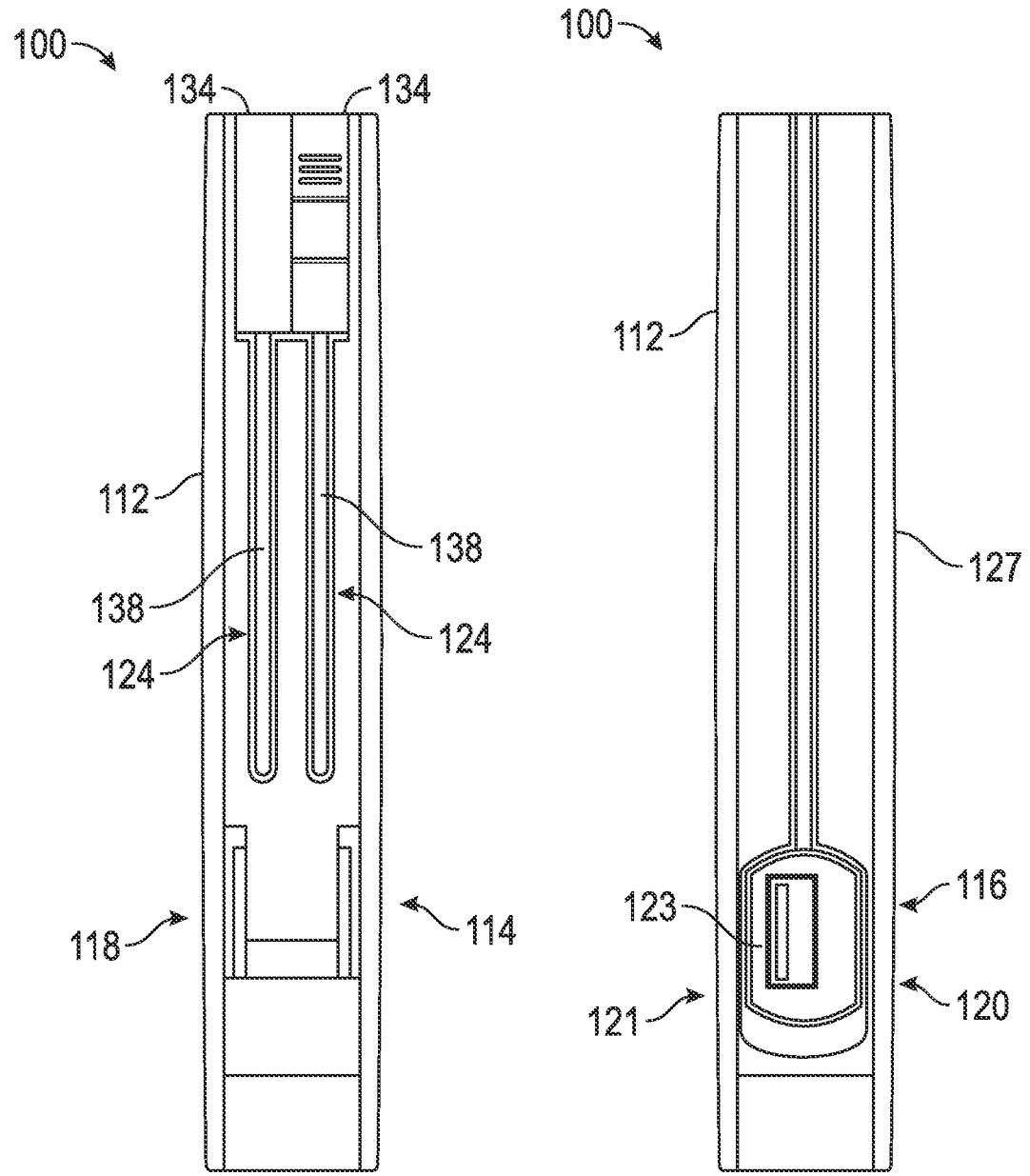

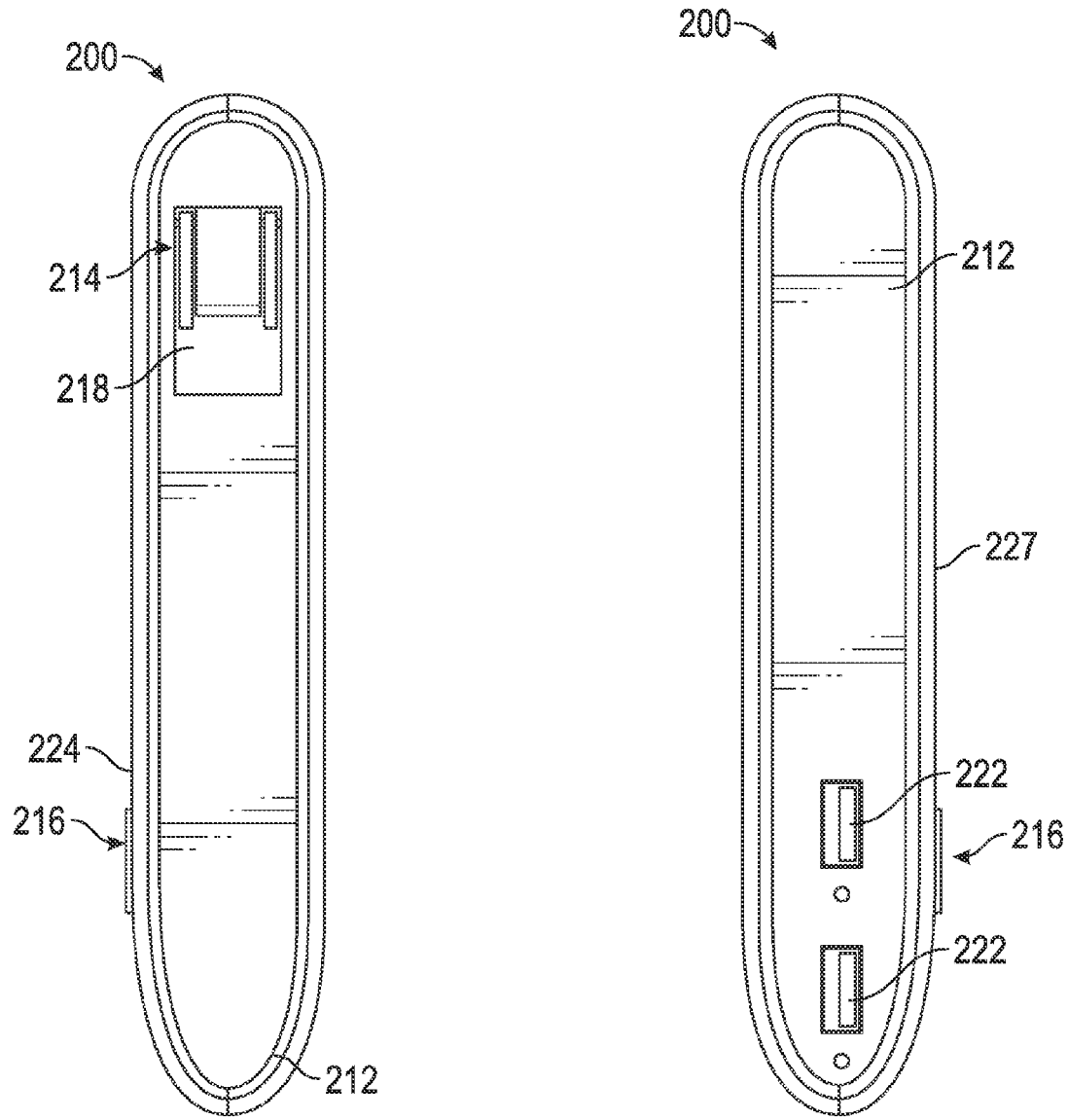

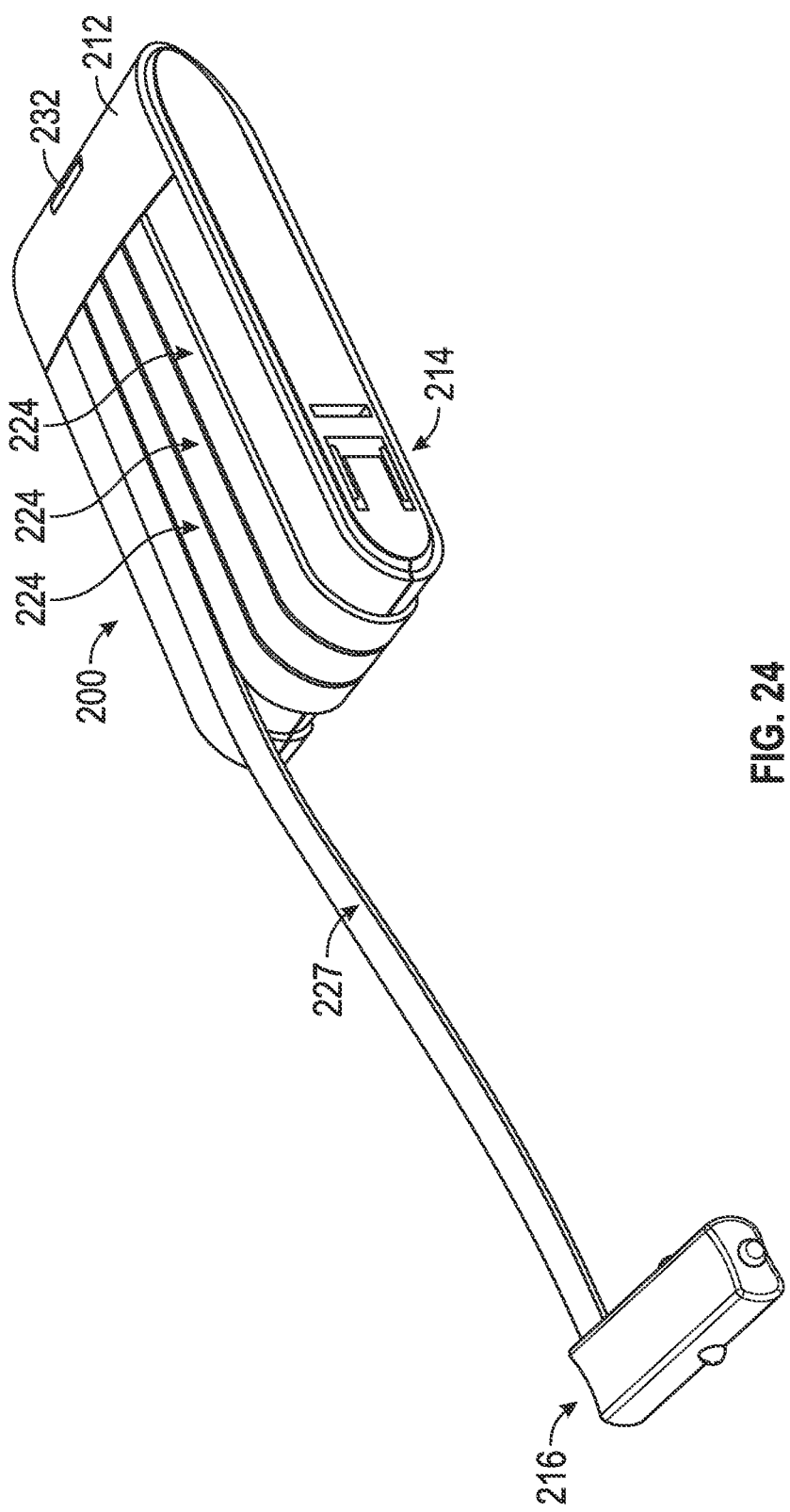

PORTABLE POWER CHARGER WITH POWER INPUT AND POWER OUTPUT CONNECTION INTERFACES

CROSS-REFERENCE TO RELATED APPLICATION

This application claims the benefit of U.S. Provisional Application No. 61/803,500, filed Mar. 20, 2013, and U.S. Provisional Application No. 61/865,891, filed Aug. 14, 2013, which are incorporated herein by reference.

FIELD OF INVENTION

The present invention generally relates to power chargers for electronic devices, and more particularly relates to a portable charger having power input connection interfaces storable within the charger housing, power output connection interfaces storable within the charger housing, a flashlight, a two-way charging interface capable of operating in a power input mode and a power output mode, and other features that improve upon the use and functionality of a portable power charger.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in co-pending U.S. application Ser. No. 13/571,992, filed Aug. 10, 2012, and Ser. No. 13/682,985, filed Nov. 21, 2012, which share common inventors with the present application and which are incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

Additionally, such portable charger devices typically require a dedicated input port for recharging the internal battery and a separate output port dedicated for recharging electrical devices from the internal battery. More particularly, such charging devices often require multiple output ports for recharging multiple electronic devices at the same time. The addition of extra charging ports compromises the size and design of the charger unit, for example, a unit with a dedicated input port and two or more output ports would need to be larger than a charger unit with just a single port due to the need to properly arrange the electronics for operation of the charger as desired.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable, has a compact size, and is easy to use in various conditions and locations to charge one or more electronic devices simultaneously, or recharge the internal battery of the charger unit for future on-the-go use, including but not limited to in a house or office, a car or an airplane. Still further, there is a need for a portable charger having a port that can act both as an input port for recharging an internal battery unit in the charger and as an output port for recharging an electronic device connected to the charger. Still further, there is a need for a portable charger that can recharge the internal battery from an external power source (either from an AC power source or a DC power source) at the same time as an electronic device connected to the charger, even while both the external power source and the electronic device are connected to the charger through the same port. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more electronic devices. In general, a portable charger kit may comprise a portable charger unit having an internal rechargeable battery unit for connecting to and recharging one or more electronic device, as necessary, at least one power input connector interface for recharging the internal battery unit from an external power source, at least one power output connector interface for connecting the power charger with at least one electronic device.

Additionally, the portable charger may include one or more power connection ports that can act as power inputs, power outputs, or both, so as to be used for recharging the internal battery from an external power source connected to the charger via a connection port, or charge electronic devices connected to the charger via a connection port. The portable charger may further be connected to an external power source and one or more electronic device at the same time, even using the same power connection port, without affecting operation of the charger to receive a charge from the external power source or supply a charge to the electronic devices.

The portable power charger can be provided with multiple and various power input interfaces to connect with various power sources—both AC and DC sources including U.S. and foreign wall sockets of varying designs, a car charger socket, an airline charger socket, and a USB interface. Preferably, the charger includes multiple power input connectors, each capable of attachment to a different power source, thereby eliminating the need for separate adapter pieces. Alternatively, the power charger can utilize interchangeable power input connectors, such as with removable, modular adapter pieces.

The portable power charge can also be provided with various power output interfaces to connect with electronic devices having varying connection interfaces, such as USB, micro-USB, mini-USB, Apple Lightning™, Apple 30-pin, or the like. Preferably, the charger includes multiple output connectors, each capable of attachment to a different connection interface, thereby eliminating the need for separate adapter pieces. Alternatively, the power charger can utilize interchangeable power output connectors, such as with the addition of removable, modular adapter pieces.

In preferred embodiments of the present invention, the power input and output connector interfaces included with the portable charger unit are storable within the charger housing when not in use or when another power interface is being used. For example, a standard AC plug interface can be pivotably attached to the charger housing. When the user needs to plug the charger into a standard U.S. wall socket for recharging the internal battery of the charger, the plug can be pivoted out from its storage cavity so that the charger can be plugged in to the wall socket. Similarly, a DC power connector, such as a car charger interface, can be storable within a cavity formed into the charger housing and movable from the charger housing to plug the charger into a car charging socket. Similarly, output connector interfaces, for example, USB, micro-USB, mini-USB, Apple Lightning™, Apple 30-pin, or the like, can be storable within the charger housing and pulled out of respective storage cavities for use to charge electronic devices using the charger.

In another aspect of the present invention, a power indicator or interface is provided on the charger housing to indicate the power capacity level of the internal rechargeable battery unit. The power interface can comprise a light or series of lights, a digital readout, or other known forms of indicating power level of a battery. Additional indicator means can be utilized in the present invention for various functionalities, including but not limited to indicating that a charge is being provided to an electronic device, either from a standard power source or the internal battery unit of the portable battery charger, or indicating the power level in an electronic device attached to the charger via the power output connector interface.

In another aspect of the present invention, the functionality of the power charger can be improved by including a flashlight feature powered from the internal battery unit.

These and other objects, features and advantages of the present invention will become apparent in light of the detailed description of embodiments thereof, as illustrated in the accompanying drawings.

BRIEF DESCRIPTION OF THE DRAWINGS

FIG. 4 shows a rear perspective view of the portable battery charger of FIG. 1 with power output connector interfaces moved to extended conditions for use.

FIG. 5 shows a side view of a car charger interface that may be provided on the portable battery charger of FIG. 1 in an extended position.

FIG. 6 shows a partial side view of a wall plug interface that may be provided on the portable battery charger of FIG. 1, with the prongs of the wall plug interface moved between an extended position and a retracted position.

FIG. 14 shows a planar side view of the portable power charger of FIG. 7.

FIG. 15 shows an opposing planar side view of the portable power charger of FIG. 7.

FIG. 20 shows a planar side view of the portable power charger of FIG. 18.

FIG. 21 shows an opposing planar side view of the portable power charger of FIG. 18.

FIG. 24 shows a perspective front view of the portable power charger of FIG. 18 with a car charger interface extended from the charger housing for use.

DETAILED DESCRIPTION OF THE DRAWINGS

Figure 1:
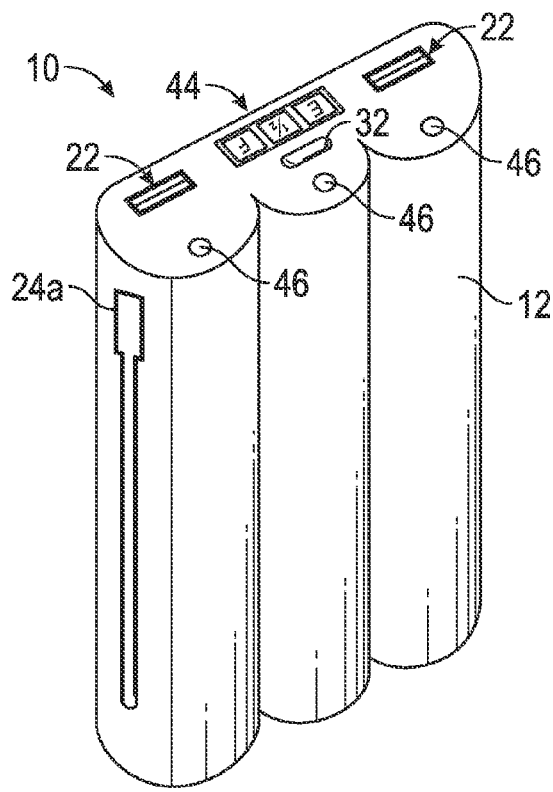
FIG. 1 shows a front perspective view of a portable battery charger in accordance with a first embodiment of the present invention.

A portable charger in accordance with a first embodiment of the present invention is shown in FIGS. 1-4 and generally designated as reference numeral 10. As illustrated, the charger 10 comprises a charger housing 12 having at least one rechargeable internal battery (not shown) for recharging one or more electronic devices via at least one power connection port or at least one power output connection interface provided on the charger housing. The power connection port may also be used to supply power to the charger 10 for recharging the internal battery unit. Additionally, or alternatively, the charger 10 further may include at least one power input connection interface provided on the charger housing 12 for supplying a charge to the internal battery when the charger is connected to an external power source via the power input connection interface. Still further, the charger 10 may include one or more lights for use as a flashlight for projecting light from the charger housing. The portable charger concepts described herein can also be used with one or more separate connector cables for connecting the charger unit with an external power source for recharging the internal battery unit and/or one or more electronic devices for recharging from the charger unit, as necessary.

The portable charger 10 in accordance with the present invention may have a variety of designs, including the embodiments discussed and illustrated herein, and may be provided with connector cables, connection ports, connection interfaces and adapters suitable for recharging the internal battery of the charger unit and recharging the batteries of various electronic devices connected thereto. For example, alternative designs for the portable charger unit are illustrated and described in co-pending U.S. application Ser. No. 13/571,992, filed Aug. 10, 2012; Ser. No. 13/682,985, filed Nov. 21, 2012, Ser. No. 13/800,825, filed Mar. 13, 2013, and Ser. No. 13/833,838, filed Mar. 15, 2013, which share common inventors with the present application and which are incorporated herein by reference. Such designs as shown in those applications can be provided with the features described herein, including pre-attached power input connection interfaces, pre-attached power output connection interfaces, one-way or two-way power connection ports, and flashlight capabilities for increasing the functionality of the power charger.

In accordance with one aspect of the present invention, the portable charger 10 preferably includes multiple power input connection interfaces provided with the charger housing 12 that can be used when needed, and which increase the versatility of the power charger 10 for use with various power sources, including both AC and DC power sources, and further including but not limited to U.S. and foreign wall sockets of varying designs, a car charger socket, an airline charger socket, and a USB interface. As illustrated in FIG. 4, the portable battery charger 10 comprises a charger housing 12 having power input interfaces in the form of an AC wall plug interface 16 and a DC car charger interface 16, both pivotally connected to the charger housing 12. As illustrated, both the wall plug interface 14 and the car charger interface 16 are in their respective retracted positions, where they are stored within cavities 18 and 20 formed in the charger housing 12. In operation, when a power input connection interface is needed to connect the charger 10 to an external power source—for example, to recharge the internal battery unit of the charger 10—it can be individually pivoted or removed out and away from the charger housing 12 to an extended position for connection to the power source. When a power input connection interface is not needed, it can be moved to its retracted position, as shown, preferably contained within the general volume and footprint of the charger housing 12, as shown in the figures and described in more detail below.

The power charger in accordance with the present invention can be connected to an external power source to recharge the internal battery unit, or provide a charging conduit between the power source and an electronic device connected to the charger. In this regard, the charger acts both as a portable power charger and as a power adapter for recharging electronic devices.

The plug interface 14 and the car charger interface 16 are each preferably independently movable to a respective extended position where they can be connected to a respective power source as needed. As noted, when a power input interface is not needed, it can be moved to a retracted position and stored within a storage cavity formed within the charger housing, such as wall plug cavity 18 and car charger cavity 20 illustrated in FIG. 4. The cavities 18 and 20 preferably having complementary shapes to the particular interfaces housed therein to efficiently store the interface without compromising the shape and size of the charger housing 12. Thus, when a power input connection interface is not in use, it can be kept in a retracted storage condition where it is preferably contained within the general volume and footprint of the charger housing 12 without interfering with use of the power charger or detracting from the size and appearance of the charger 10.

As shown in FIGS. 4-5, the car charger interface 16 is pivotally connected at a first end 17 to the charger housing 12. To extend the car charger interface 16, the user can grasp the interface and pivot it out of its cavity 20 so that it generally extends out and away from the charger housing 12, as generally shown in FIG. 5, in order to engage a car charger socket. Similarly, the wall plug interface 14 includes prongs 15, each of which are pivotally connected to the charger housing 12. As illustrated, the prongs 15 are separably pivotable away from one another to store the wall plug interface 16 within the cavity 18 in a retracted position. FIG. 6 illustrates the pivoting movement of the wall plug interface 16 between the retracted, storage, position and the extended, use, position. Alternatively, the prongs 15 can be collectively pivoted to a retracted position whereby they remain in a generally parallel relationship both in the retracted and extended positions of the interface 16.

Each of the power input connector interfaces is located on the charger housing 12 so as not to interfere with the other input interfaces or with any of the power output connector interfaces or the power connection ports provided on the charger housing 12. Finger spaces 19 and 22 may further be included for each cavity 18 and 20 to facilitate grasping of the interfaces to pivot them to a use condition.

As shown, in FIG. 4, the plug interface 14 and the car charger interface 16 are moved to respective storage conditions where they are preferably stored within the general volume and footprint of the charger housing 12 yet easily pivoted to a use condition when necessary. This condition of the charger 10 is generally used when a power input connection interface is not needed—i.e., the internal battery unit is charged and the charger 10 is available for portable use as a power charger for other electronic devices. It is advantageous for "on-the-go" use to have the power input interfaces contained within the general footprint of the charger housing 12 so that they do not interfere with use, transportation or storage of the charger, or do not unnecessarily increase the size of the charger 10, since a compact but powerful and versatile portable power bank is desirable.

As noted, the charger 10 can include additional power input interfaces in addition or in lieu of the illustrated plug and car charger interfaces, including, but not limited to an airplane charge interface, foreign plug designs, a USB interface, both male and female, and the like. In this regard, the present invention can use various combinations of interfaces to improve the versatility of the charger for recharging in a variety of locations and environments.

Still further, a power connection port can be provided to connect the power charger 10 with an external power source via a connector cable or to a desired adapter for use with any complementary external power source. For example, as shown in FIGS. 1 and 4, USB ports 22 may be provided and the power charger 10 can be connected to an external power source using a connector cable inserted into the USB port 22. The other end of the cable can be connected, for example, with a computer, for charging the power charger 10, or an interface adapter for use with, perhaps, a foreign wall socket design.

Figure 2:
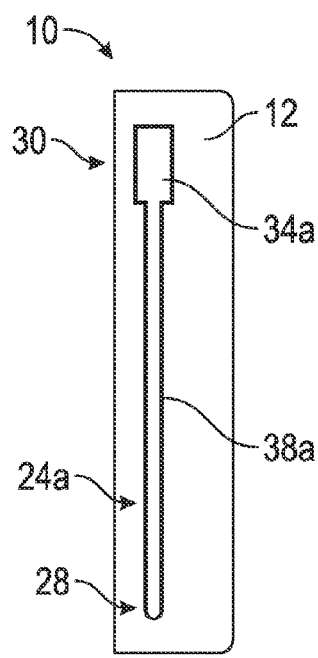
FIG. 2 shows a side planar view of the portable battery charger of FIG. 1.
Figure 3:
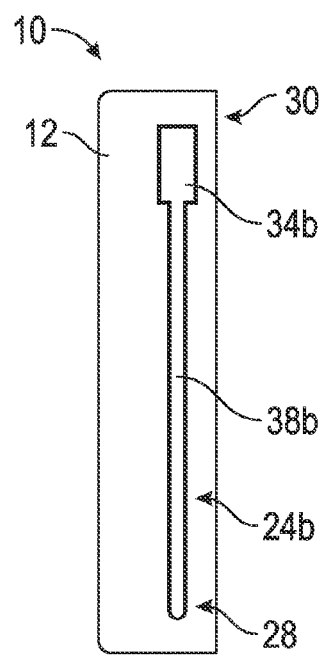
FIG. 3 shows another side view of the portable battery charger of FIG. 1.

In accordance with another aspect of the present invention, the portable charger 10 preferably includes multiple power output connection interfaces provided with the charger housing 12 that can be used when needed, and which increase the versatility of the power charger 10 for use with various portable electronic devices. For example, the charger housing 12 can include connectors 24 attached to the charger housing 12 and preferably stored within the housing 12 when not in use, as shown in FIGS. 1-3, but extendable from the housing 12 for connection with electronic devices for recharging, as shown in FIG. 4, such as designs described and illustrated in co-pending U.S. application Ser. No. 13/571,992, filed Aug. 10, 2012, which shares common inventors with the present application and which is incorporated herein by reference.

In embodiments of the present invention, the power output connector interfaces can be connector cables 24 attached to the charger housing 12 which may be stored within the charger housing 12 in a retracted, non-use, position, and pivoted or pulled away from their storage cavities 26 to an extended, or operation, position. The connector cables 24 can be stiff, or more preferably, flexible and bendable to move to a position where they can easily be attached to an electronic device for charging from the portable charger 10. A first end 28 of each power output connector interface 24 is attached to the charger housing 12 and operatively connected to the internal battery of the charger 10. A second end 30 is extendable from the charger housing 12 for engagement with an electronic device.

As illustrated in FIG. 4, the charger unit 10 in accordance with a first embodiment comprises a charger housing 12 having three power output connector cables 24 attached to output ports (not shown) of the charger unit 10 to connect respective electronic devices to the charger unit 10 to be recharged from an internal rechargeable battery unit. As shown in FIG. 1, the charger unit further includes an on-off power button 32 on the end that is operatively connected to the internal functional components and electrical circuitry for operating the charger unit 10.

Storage cavities 26 are formed into the charger housing 12 for receiving the connector cables 24 when not in use. For example, cavities 26a and 26b are formed on each side of the charger housing 12 for receiving a respective connector cable, as shown in FIGS. 2-4. As further shown in FIG. 4, a third storage cavity 26c is formed on the back of the charger housing 12 for receiving its own connector cable 26. FIGS. 2-3 each shown a connector cable 24a and 24b on each side of the charger housing 12 disposed within the general footprint and volume of the charger housing in a non-use condition. FIG. 4 illustrates a third connector cable 24c disposed within the general footprint and volume of the charger housing 12 in a non-use condition. By comparison, FIG. 4 further shows the two side connector cables 24a and 24b removed from their storage cavities 26a and 26b to make the connection interfaces thereon exposed for connection to electronic devices.

Preferably, the connector cables 24 are permanently connected to the charger housing 12 and their respective power outputs, although alternate embodiments may include connector cables that are removable and replaceable so as to permit different connection interfaces to be used with the charger unit 10.

Referring again to FIGS. 2-4, the connector cables 24 each includes a head portion 34 at the distal end 28 having a connection interface 36. The head portion 34 is connected to the charger housing 12 by an intermediate cord portion 38. For example, one cable 24a comprises a micro-USB connection interface 36a, while another cable 24b comprises an Apple Lightning™ connection interface 36b, and a third cable 24c comprises an Apple 30-pin connection interface 36c. The cables 24 may utilize any known interface without departing from the spirit and principles of the present invention. Additionally, as noted above, the cables 24 can be removable and replaceable so as to permit a user to easily change the connection interface 36 for use with varying electronic devices. In this regard, the proximal ends 28 of the connector cables 24 include an interface that complements a respective output port provided in the charger housing 12 for attaching the connector cables 24 to the charger housing 12.

The connector cables 24 are preferably flexible so that they can be bent away from the charger housing 12 to connect to an electronic device during use of the charger unit 10. In the illustrated embodiment, each of the storage cavities 26 includes a channel 40 to receive a cord portion 38 of the cables 24 within the footprint of the charger housing 12. In alternate embodiments, a portion of the cord portion 38 can be retracted within the charger housing 12 through an opening and retracted using a spring-biased mechanism as is generally known in the art. In this regard, a longer connector cable can be provided without compromising the size of the charger housing 12 and permitting a compact charger suitable for on-the-go usage.

The distal end 30 of each connector cable 24, having the connection interface 36, includes the head portion 34 at the end of the cord portion 38 that is received within a respective storage cavity 42 in the charger housing 12. Preferably, the shape of the head 34 complements the storage cavity 42 so that the connection interface 36 can be stored within the footprint and exterior volume of the charger housing 12 with no parts sticking out. Additionally, the head and cord portion 34 and 38 of each cable 24 is preferably snap-fitted into a respective storage cavity 26 when stored so that the connector cables 24 do not accidentally disengage or otherwise come loose from the storage cavities 26.

Each of the power output connection interfaces is located on the charger housing 12 so as not to interfere with the other output interfaces or with any of the power input connection interfaces or the power connection ports provided on the charger housing 12. Finger spaces may further be included for each cavity to facilitate grasping of the interfaces to pivot them to a use condition.

A power charger 10 in accordance with the present invention can also be connected to one or more electronic devices for recharging from the internal battery of the charger 10 or directly from an external power source via the portable charger 10 without using the power output connection interfaces provided in the charger housing 12. In preferred embodiments, at least one electronic device can be connected to the charger 10 via a power output connection port 22 provided on the charger housing 12, for example, using a connector cable inserted into the output port 22. As illustrated in FIG. 1, the charger housing 12 includes two output ports 22 in the form of standard USB female connection ports. A separate connector cable inserted into one of these ports 22 can further be combined with an adapter unit to interface with various charging interfaces used on electronic devices, including for example a USB interface, a mini-USB interface, a micro-USB interface, an AC/DC interface, and the like. Such an output adapter unit can comprise interchangeable parts, each adaptable to a different type of interface, or alternatively, the portable power charger can be adapted for use with an adapter comprising multiple different interfaces on the same part—e.g., a squid connector with multiple connectors.

Though two USB ports are illustrated, the present invention can use more or fewer ports without departing from the spirit and principles of the present invention. Additionally, though the USB ports 22 are preferably intended as power output connection ports, the portable power charger 10 can be provided with any combination of input and output ports as needed, or further, utilize two-way charging interfaces to increase the versatility of the portable charger 10 such that a single port can be used to either recharge the internal battery of the charger 10, or charge electronic devices connected to the charger 10 from the internal battery via the port 22, or even charge such electronic devices while recharging the internal battery where the electronic devices and an external power source are connected to the charger 10 at the same time via a single power connection port 22.

Accordingly, any of the power connection ports, such as USB connection ports 22 shown in FIG. 1, can be used to connect the power charger 10 to a desired adapter for use with any complementary external power source. Thus, where the charger 10 only includes a wall plug interface 14 and a car charger interface 16 for power input interfaces, as shown in other figures, for example, the USB port 22 can be used to connect to a different power source, such as a computer via a connector cable. In this regard, the USB connection port 22 can comprise a two-way charging interface, such as described and illustrated in co-pending U.S. application Ser. No. 13/682,985, filed Nov. 21, 2012, which shares common inventors with the present application and which is incorporated herein by reference. In this mode of operation, the charger 10 can be simultaneously connected to an external power source for recharging the internal battery unit of the charger 10 and one or more electronic devices being recharged either from the charger's internal battery or directly from the external power source.

Similarly, the power connection ports 22 can be used to connect to a desired adapter for use with any complementary electronic device. Thus, where the charger 10 only includes certain power output connection interfaces, a USB port 22 can be used to connect to an electronic device requiring a specific connection interface that is not included on any of the power output connection interfaces or which may be preoccupied by another electronic device requiring a charge.

In preferred embodiments of the present invention, the rechargeable battery unit is disposed within the charger housing 12. The rechargeable battery unit is operatively connected with the power input connector interface(s) provided with the charger housing 12 for recharging the battery when the charger 10 is connected to an external power source. The rechargeable battery is also operatively connected with the power output connector interfaces for recharging electronic devices connected to the power charger 10 from the rechargeable battery unit. In preferred embodiments, the battery unit comprises a rechargeable Lithium-Ion battery. For example, one embodiment of the portable charger unit includes three Lithium-Ion batteries, provided in series, to supply 9,000 mAh. In an alternate embodiment, a single Lithium Polymer battery can be provided to supply 10,000 mAh.

The power charger 10 also includes various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and various input/output (I/O) support circuitry. The electrical components may also include components for sending and receiving data and media (e.g., antenna, receiver, transmitter, transceiver, etc.).

The power charger 10 also comprises a controller, including a processing unit, configured to execute instructions and to carry out operations associated with the power charger. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with a power indicator means 44 to provide the user with information for how much capacity is remaining in the internal rechargeable battery unit and whether the charger 10 needs to be connected to an external power source for recharging.

The processing unit also includes a smart interface to determine the total current required for specific devices connected to the power charger. In this regard, the processing unit operates in connection with input/output (I/O) support circuitry to control interactions with devices connected to the power charger. The I/O support circuitry may be integrated with the processing unit or may be a separate component. Generally, the I/O support circuitry operates by exchanging power (and possibly data) between the power charger and electronic devices connected thereto via the power output connector interface.

The processing unit further includes a storage unit that provides a place to hold data or instructions for operation of the power charger and rechargeable battery unit, or data exchanged between the power charger, a computer, and electronic devices connected to the power charger, or memory needed for further operations of the power charger.

The USB connection ports 22 of the power charger 10, described above for connecting additional devices to the portable battery charger 10 for recharging, can also be used for data exchange, without departing from the principles and spirit of the present invention.

Power chargers in accordance with the designs described and illustrated herein are readily portable as a result of the small size and increased portability by storing power input connection interfaces and power output connection interfaces within the footprint of the charger housing 12 when not in use. Despite the small size of the power charger 10, the power capacity is very high so that the battery unit can accommodate multiple electronic devices at the same time, if necessary.

Referring again to FIG. 1, the charger unit 10 also includes a flashlight feature comprising a flashlight bulb or bulbs 46 at one end of the charger housing 12. Preferably, the flashlight comprises at least one LED bulb 46 mounted within the charger housing 12 to project light from the charger 10 for use as a flashlight. In the embodiment illustrated in FIG. 1, three LED bulbs 46 are provided, each operatively connected with the rechargeable battery unit of the charger 10. Referring to FIG. 4, a power control button 48 is provided to control operation of the flashlight feature. The button 48 is also operatively connected to the internal battery unit so that when the button 48 is pressed to turn the flashlight "On," the flashlight is powered by the internal battery unit of the charger 10. Preferably, all three lights operate when the button 48 is pressed; however, in alternative embodiments, the lights can turn on and off in various combinations to increase or decrease the intensity of light from the charger 10. In such embodiments, the button 48 can be used to control the intensity of the light, perhaps by pressing the button 48 several times to cycle through predefined combinations of the three LED lights. Referring to FIG. 4, the flashlight power control interface can further include a power indicator, such as an LED ring 50 provided around the power button, to confirm that the flashlight portion is in use.

The portable power charger 10 also includes a power indicator means 44, shown in FIGS. 1 and 4, that will indicate not only that an electrical current is being supplied to an electronic device connected to the power output connector interface, but also the remaining capacity of the internal rechargeable battery unit in the power charger 10. For example, in an embodiment of the present invention, the power indicator means 44 comprises a series of lights, but can include more or fewer lights without departing from the principles and spirit of the present invention. When the battery is at full capacity, all the lights will be lit up. As the battery power decreases, the lights will correspondingly decrease by one as the power is used. If there is no capacity left in the internal battery, none of the lights will be lit up or a light corresponding to an "empty" indication will be lit up. Alternatively, the power indicator means 44 can comprise a digital interface that provides a battery capacity level for the internal rechargeable battery unit, or another known means of providing battery level information.

The processing unit of the power charger 10, which can keep track of the capacity level of the internal rechargeable battery unit, store data or provide a conduit means by which data can be exchanged between electronic devices, such as between a smart phone and a computer, communicates with the battery unit to determine how much capacity is remaining in the battery. Upon determining the capacity level, the processing unit communicates with the power indicator means 44 to provide the user with the appropriate signal and information for showing how much capacity is remaining in the internal battery.

The processing unit may also include a smart interface to determine the total current required for the specific electronic devices connected to the battery charger 10. Additionally, the battery charger 10 may comprise an internal switch to draw power from the rechargeable battery unit or essentially turn off the battery unit. For example, the processing unit can determine if the power charger is connected to an external power source. If so, when an electronic device is also connected to the power charger 10, the processing unit can ensure that the electronic device is being charged directly from the external device instead of drawing power from the rechargeable battery unit as it is being recharged itself. Further, the processing unit can determine when the power charger 10 is disconnected from an external power source, and if still connected to an electronic device, sufficiently switch the internal circuitry of the battery charger 10 so that the electronic device continues to be recharged from the rechargeable battery unit without delay.

The processing unit also preferably includes a timer for automatically turning the battery charger 10 off if there is no device attached to the power charger 10 for a predetermined period of time, or if any device still attached to the power charger 10 has reached maximum capacity. In this regard, the capacity of the internal rechargeable battery in the power charger 10 can be preserved. Upon shut down of the power charger 10, the power indicator means 44 will indicate that the power charger 10 is being turned off—for example, the lights will provide a sequential blinking signal.

Additional indicator means can be utilized in the present invention for various functionalities, including but not limited to indicating that a charge is being provided to an electronic device, either from a standard external power source or from the internal rechargeable battery unit of the portable power charger 10, or indicating the power level in an electronic device attached to the power charger 10 via the power output connector interface.

Referring again to FIG. 1, the charger housing 12 is also provided with a power control interface 32 for turning the charger on and off. As shown, the power control interface 32 comprises a manual on/off button. In alternate embodiments, the charger 10 can utilize an automatic power on and power off protocol, such as described above and in co-pending U.S. application Ser. No. 13/682,985, incorporated herein by reference. Still further, the charger 10 can be provided with such an automatic on/off protocol, yet still include a manual power button or switch (e.g., button 32) for additional control over use of the charger 10.

In accordance with the present invention, the charger housing 12 can have a small size to increase the portability and versatility of the power charger 10. When the power input connection interfaces and power output connection interfaces are stored within their respective cavities, they can be fully disposed within the general volume and footprint of the charger housing 12, such as more clearly illustrated in FIG. 1, where none of the interfaces can be seen from the front view when all are stored in their respective retracted positions. Moreover, each power input and output connection interface can be selectively pivoted or extended out from the charger housing 12 for use without disrupting or needing to move the other connection interfaces, such as just needing the car charger interface or wall plug interface to recharge the internal battery, or one or more of the output connection interfaces to connect electronic devices to the charger 10, as partially illustrated in FIG. 4. The charger 10 permits multiple output connection interfaces to be used at the same time, and also permits electronic devices to be connected to the charger 10 via power output connection interfaces even when the charger 10 is connected to an external power source—for example, either using the wall plug interface 14, the car charger interface 16, or a power connection port 22 with a separate charging cable.

An alternate embodiment of a portable power charger in accordance with the present invention is shown in FIGS. 7-15, and generally designated as reference numeral 100. As illustrated, the charger 100 comprises a charger housing 112 having at least one rechargeable internal battery (not shown) for recharging one or more electronic devices via at least one power connection port or at least one power output connection interface provided with the charger housing 112. Additionally, the charger 100 includes at least one power input connection interface provided with the charger housing 112 for supplying a charge to the internal battery when the charger 100 is connected to an external power source via the power input connection interface. At least one power connection port 122 may also be used to supply power to the charger 100 for recharging the internal battery unit.

Figure 7:
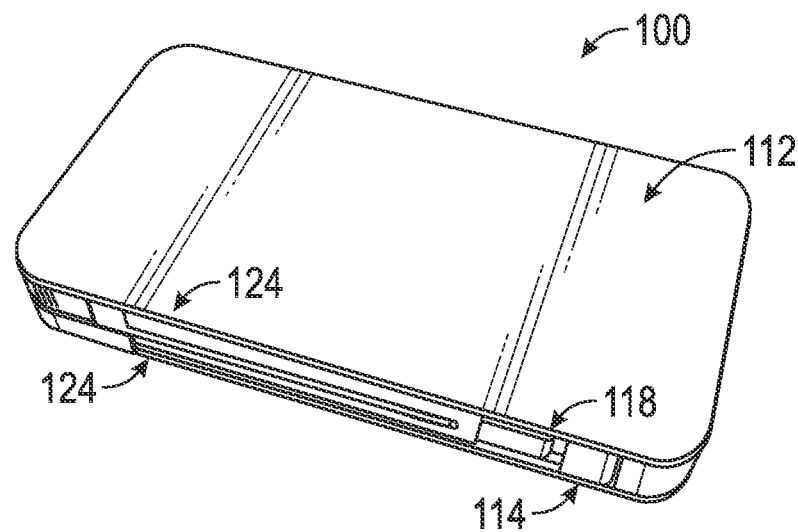
FIG. 7 shows a front perspective view of a portable power charger in accordance with a second embodiment of the present invention.
Figure 8:
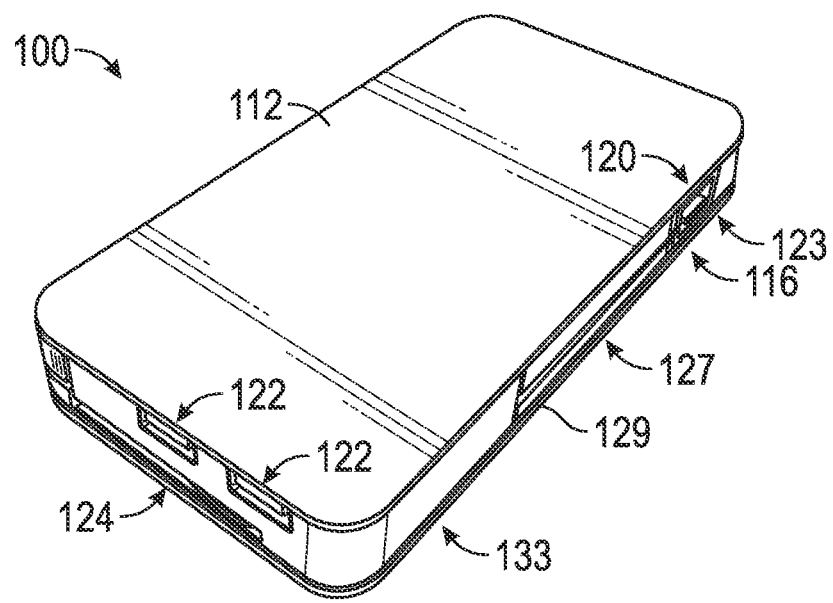
FIG. 8 shows a rear perspective view of the portable power charger of FIG. 7.
Figure 9:
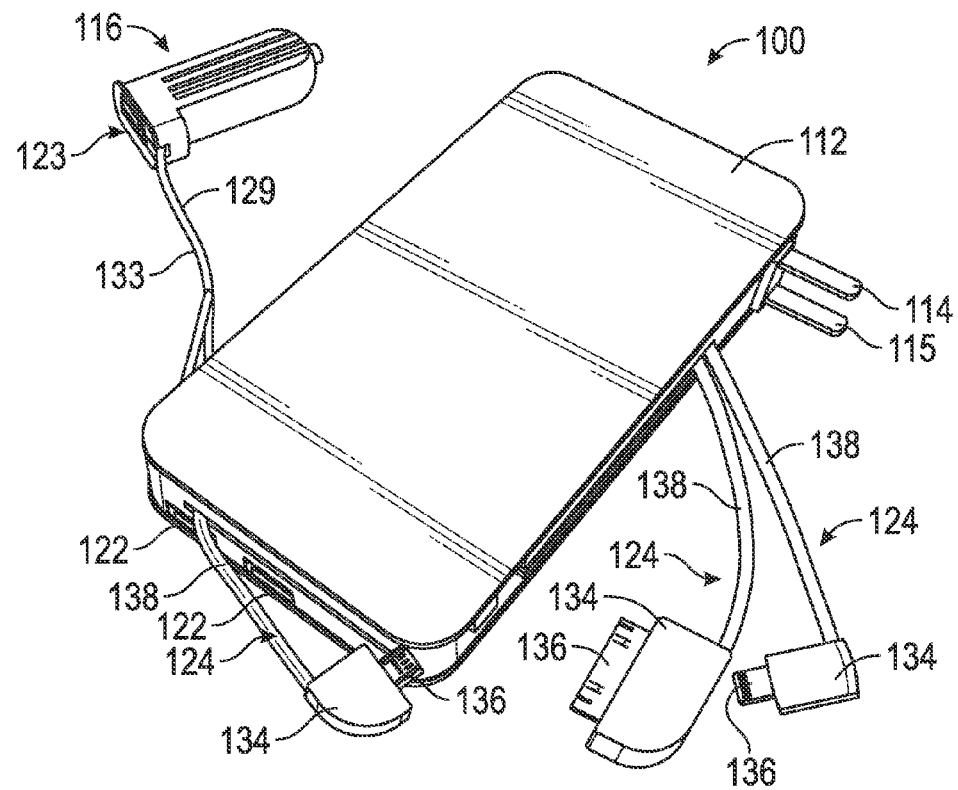
FIG. 9 shows a front perspective view of the portable power charger of FIG. 7 with power output and input connection interfaces removed from the charger housing for use.

More preferably, the portable charger 100 preferably includes multiple power input connection interfaces provided with the charger housing 112 that can be used when needed, and which increase the versatility of the power charger 100 for use with various power sources, including both AC and DC power sources, and further including but not limited to U.S. and foreign wall sockets of varying designs, a car charger socket, an airline charger socket, and a USB interface. As illustrated in FIG. 9, the portable battery charger 100 comprises a charger housing 112 having power input interfaces in the form of an AC wall plug interface 114 pivotally connected to the charger housing 112 and a DC car charger interface 116 removable attached to the charger housing 112. As illustrated in FIGS. 7-8, both the wall plug interface 114 and the car charger interface 116 are in respective retracted positions, where they are stored within cavities 118 and 120 formed in the charger housing 112. In operation, when a power input connection interface is needed to connect the charger 100 to an external power source—for example, to recharge the internal battery unit of the charger 100—it can be individually pivoted or removed out and away from the charger housing 112 to an extended position for connection to the power source. When a power input connection interface is not needed, it can be moved to its retracted position and preferably contained within the general volume and footprint of the charger housing 112, as shown in the figures and described in more detail below.

The plug interface 114 and the car charger interface 116 are each preferably independently movable to a respective extended position where they can be connected to a respective power source as needed. When a power input interface is not needed, it can be moved to a retracted position and stored within a storage cavity formed within the charger housing 112, such as wall plug cavity 118 and car charger cavity 120 illustrated in FIGS. 14-15. The cavities 118 and 120 preferably having complementary shapes to the particular interfaces housed therein to efficiently store the interface without compromising the shape, size and appearance of the charger housing 112. Thus, when a power input connection interface is not in use, it can be kept in a retracted storage condition where it is preferably contained within the general volume and footprint of the charger housing 112.

Figure 10:
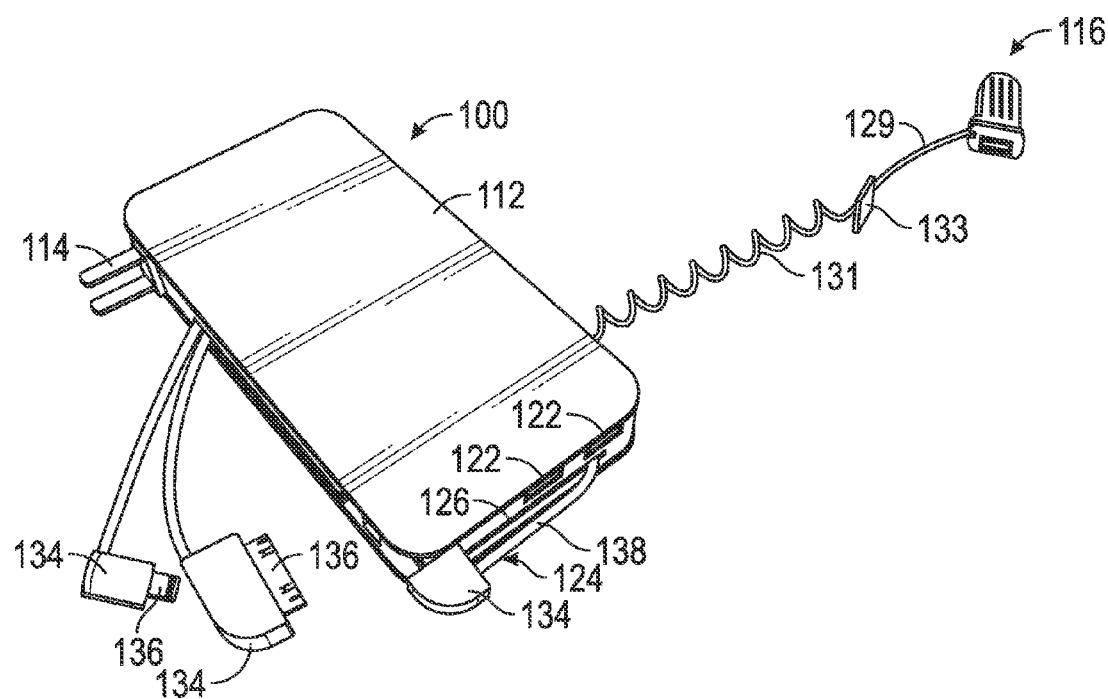
FIG. 10 shows a rear perspective view of the portable power charger of FIG. 7 with a car charger interface extended from the charger housing for use.

As shown in FIGS. 9-10, the car charger interface 116 is attached at a first end to the charger housing 112 using a cable 127, preferably a flexible cable that permits extension of the car charger interface 116 away from the charger housing 112. As illustrated in FIG. 10, the car charger interface cable 127 comprises a coiled design that can be stored within the charger housing 112 when the interface is in its retracted, storage, non-use position. The other end of the charging cable 127 is connected to the car charger interface 116. To extend the car charger interface 116, the user can grasp the interface and pull it out of its cavity 120, as generally shown in FIGS. 9-10, so that it generally extends out and away from the charger housing 112 in order to engage a car charger socket. As shown in FIG. 15, a fingernail slot 121 may be provided around the interface 116, when stored, to facilitate disengagement of the interface 116 and cable 127 from the charger housing 112.

In accordance with preferred embodiments of the present invention, the charging cable 127 is stored within the general volume and footprint of the charger housing 112 when not needed. In the embodiment illustrated in FIGS. 7-15, the charging cable 127 has two parts—a straight part 129 that extends along the side of the charger housing 112 for storage, and a coiled part 131 that may be stored within the charger housing 112. In such a design, a cap 133 is provided intermediate to the straight part 129 and the coiled part 131, essentially delineating the transition between the two parts, but more importantly covering the storage cavity of the coiled portion 131 and holding the coiled part 131 within the charger housing 112 when the car charger interface 116 is stored away within the charger housing 112. When the interface 116 is removed from the housing 112 and extended away therefrom, the straight part 129 extends out from the cap 133. If additional length and/or flexibility is required for use of the car charger interface 116, the cap 133 can be removed from the charger housing 112 so that the coiled portion 131 can be pulled from its storage cavity and extended away from the charger housing 112. As shown, the cap 133 stays attached to the charging cable 127. When the cable 127 is returned to its storage condition, the cap 133 preferably snap fits back onto the charger housing 112.

Figure 16:
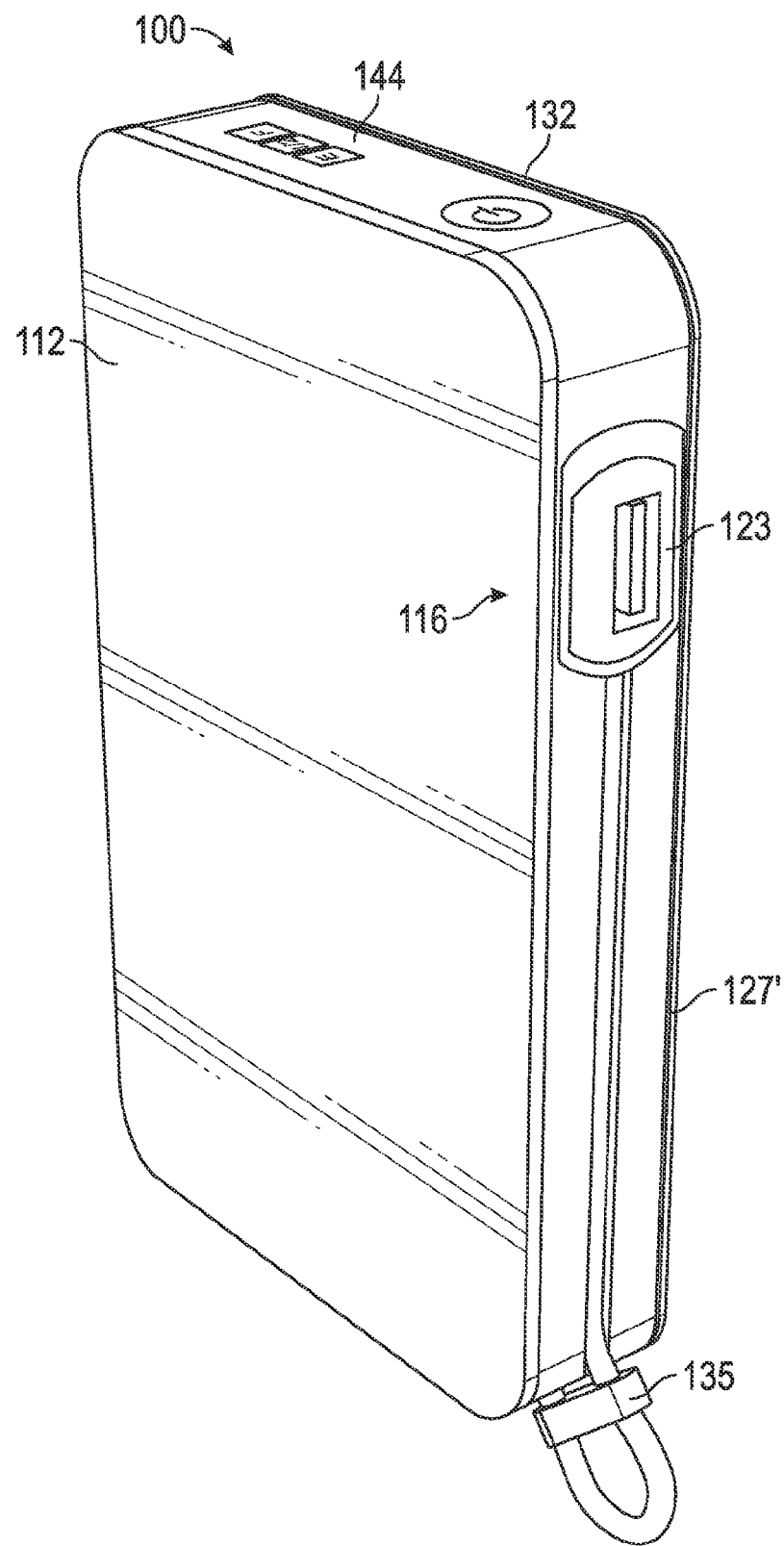
FIG. 16 shows a front perspective view of a portable power charger in accordance with a third embodiment of the present invention.
Figure 17:
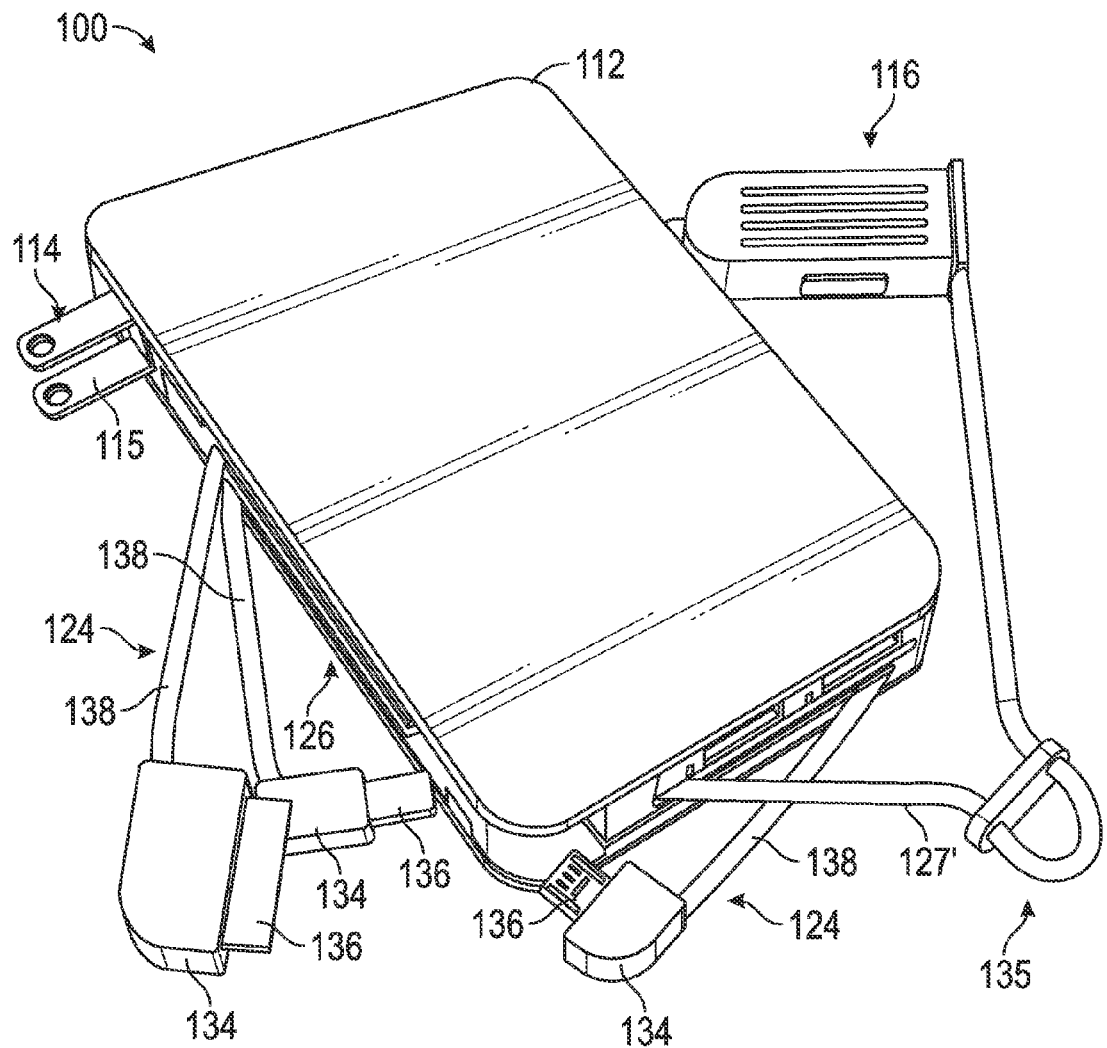
FIG. 17 shows a front perspective view of the portable power charger of FIG. 16 with power output and input connection interfaces removed from the charger housing for use.

In an alternate embodiment, illustrated in FIGS. 16-17, the charging cable 127' attached to the car charger interface 116 extends along the outer side edge and end edge of the charger housing 112. A cable lock 135 is provided to keep the cable 127' taut to the housing 112 when stored. More particularly, a slack portion of the charging cable 127' is provided proximate the corner of the charger housing 112 to ensure that the car charger interface 116 and the charging cable 127' can be securely snap fitted into the appropriate storage cavity 126 when not in use. When the car charger interface 116 is needed, the interface 116 is removed from its storage cavity 142 along with as much of the charging cable 127' as is needed. In some embodiments, additional length of cable can be stored within the charger housing 112, preferably is a spring-biased fashion so that the cable 127' can be returned within the housing 112 when no longer needed.

As further illustrated, the car charger interface 116 may also include a connection port—such as a USB female connection port 123—which may be used when the car charger connection interface 116 is in either its extended condition or its retracted condition. More particularly, the connection port 123 provided on the car charger interface 116 may be used as a power output, power input, or both.

Similarly, a wall plug interface 114 is pivotally connected to the charger housing 112, and movable between use and non-use conditions. In particular, the wall plug interface 114 includes prongs 115, which are pivotally connected to the charger housing 112. As illustrated, the prongs 115 can be collectively pivoted to a retracted position whereby they remain in a generally parallel relationship both in the retracted and extended positions of the interface 114. FIGS. 7 and 9 illustrate the pivoting movement of the wall plug interface 114 between the retracted, storage, position (also shown in FIG. 14) and the extended, use, position (also shown in FIGS. 12-13).

Figure 12:
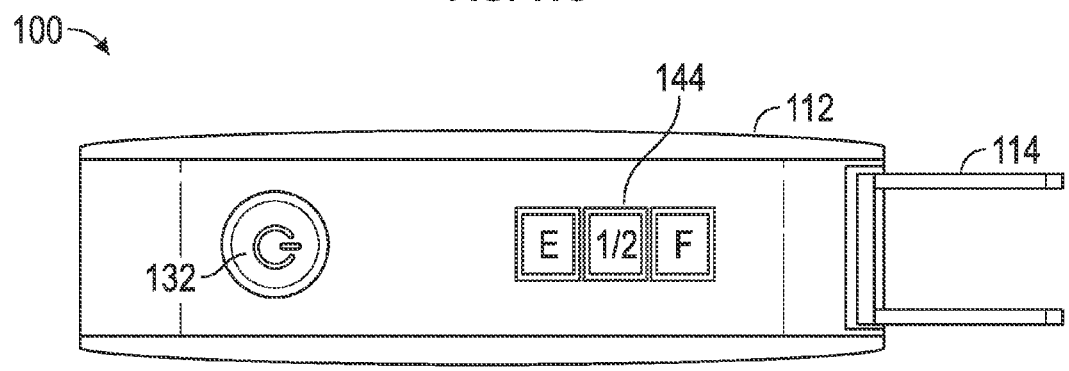
FIG. 12 shows a planar end view of the portable power charger of FIG. 7.

As illustrated in FIG. 9, the charger unit 100 comprises a charger housing 112 having three power output connector cables 124 attached to output ports of the charger unit 100 to connect respective electronic devices to the charger unit 100 to be recharged from an internal rechargeable battery unit. As shown in FIG. 12, the charger unit 100 further includes an on-off power button 132 on the end that is operatively connected to the internal functional components and electrical circuitry for operating the charger unit 100.

Figure 11A:
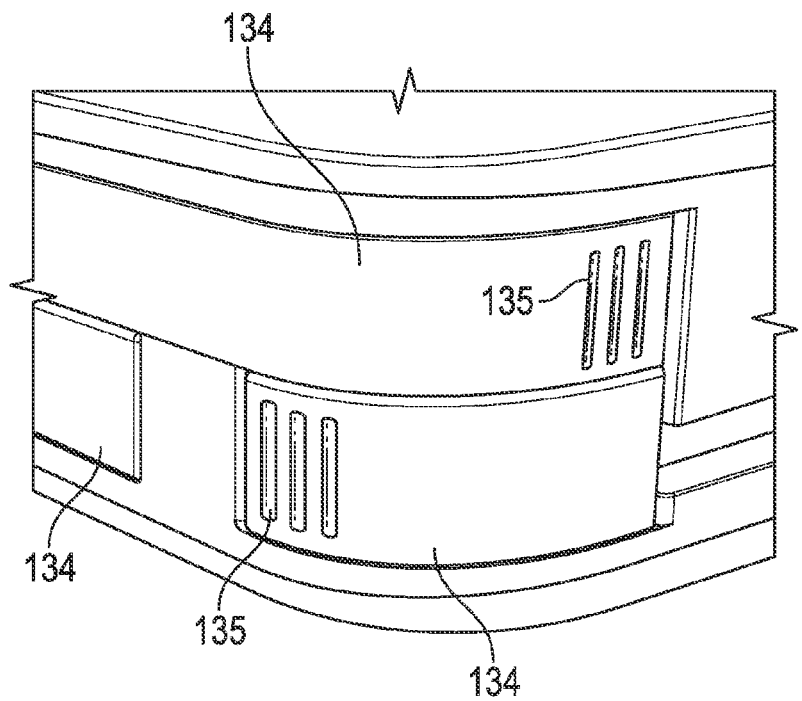
FIGS. 11a-11c illustrate a close-up perspective view of three power output connection interfaces used with the portable power charger of FIG. 7 and their respective storage cavities in the charger housing.
Figure 11B:
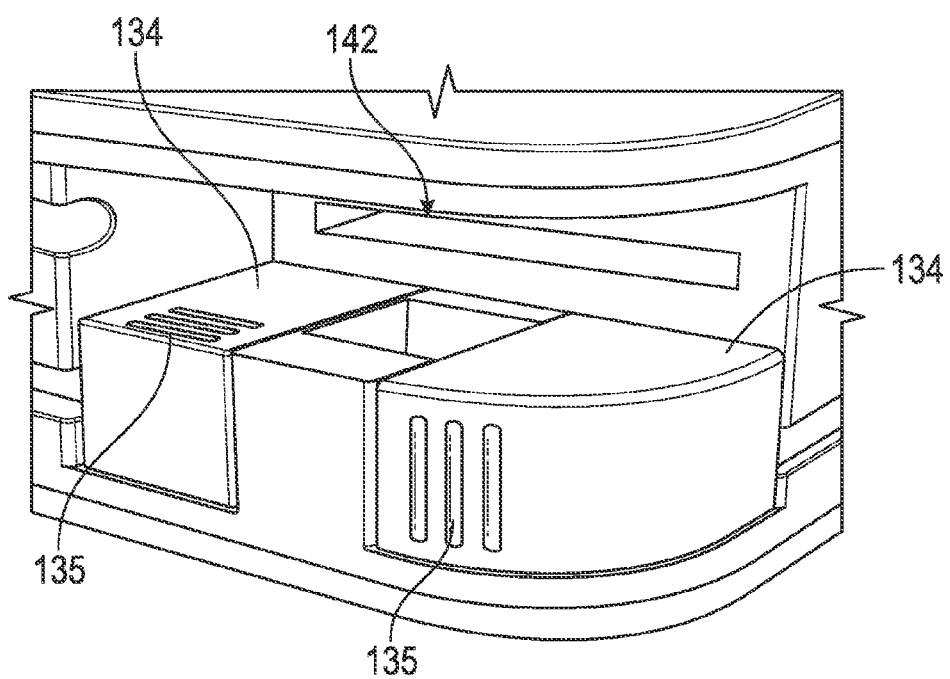
Figure 11C:
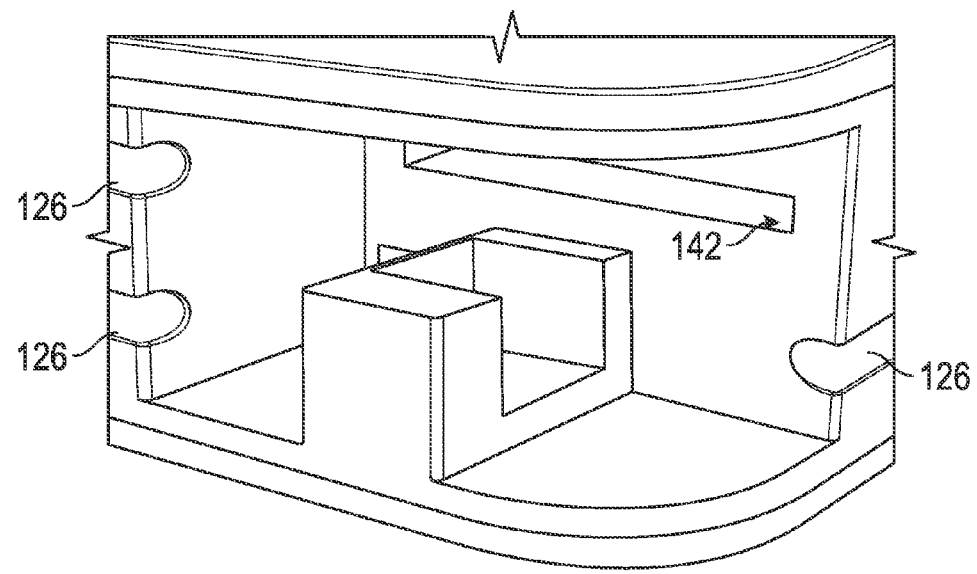

Storage cavities 126 are formed into the charger housing for receiving the connector cables 124 when not in use. In a preferred embodiment, the storage cavities 126 can be essentially combined so that multiple connection interfaces 136 attached at the ends of respective cables 124 are stored in generally the same portion of the charger housing 112. Each interface 136 may still be independently removed from the housing 112 without inhibiting use or storage of the other interfaces. FIGS. 11a-11c shows a close-up of a combined storage cavity 142 for multiple power output connection interfaces 136. As illustrated in FIG. 11a, three output interfaces 136 are in retracted, storage positions. In FIG. 11b, one of the output interfaces has been removed, presumably for use to charge an electronic device requiring a particular connection interface (e.g., an Apple 30-pin interface). As illustrated, the other two interfaces remain in respective storage positions. In FIG. 11c, all three output interfaces 136 have been removed from their respective storage cavities 142, presumably to charge multiple electronic devices—each requiring a different connection interface—from the power charger 100. When no longer needed, each connection interface 136 can be snap fitted back into its respective storage cavity 142.

As further illustrated in FIGS. 11a-11c, each head portion 134 for each power output connection cable 124 can be provided with friction grips 135 to facilitate removal of the head portion 134 from the charger housing 112 for use. Additionally, the storage cavities 126 are designed to complement the shape of the head portion 134 and connection interfaces 136 so as to ensure snug fit, facilitate snap fitting the interfaces 136 into storage pace to prevent unintentional or accidental removal, and to efficiently use space within the footprint of the charger housing 112 to create a compact and easily portable design for the power charger 100 with maximized functionality. As shown, the storage cavities 142 provide specific nooks for snuggly receiving the specific interface portion 136 as well as the head portion 134.

Preferably, the connector cables 124 are permanently connected to the charger housing 112 and their respective power outputs, although alternate embodiments may include connector cables that are removable and replaceable so as to permit different connection interfaces to be used with the charger unit 100.

The connector cables 124 are preferably flexible so that they can be bent away from the charger housing 112 to connect to an electronic device during use of the charger unit. In the illustrated embodiment, each of the storage cavities 126 includes a channel 140 to receive a cord portion 138 of the cables 124 within the footprint of the charger housing 112. In alternate embodiments, a portion of the cord portion 138 can be retracted within the charger housing 112 through an opening. In this regard, a longer connector cable can be provided without compromising the size of the charger housing 112 and permitting a compact charger suitable for on-the-go usage.

Referring again to FIG. 9, each connector cable 124 includes a distal end 130 having a unique connection interface 136 fitted within the storage cavity 126. For example, one cable 124a comprises a micro-USB connection interface 136a, while another cable 124b comprises an Apple Lightning™ connection interface 136b, and a third cable 124c comprises an Apple 30-pin connection interface 136c. The cables 124 may utilize any known interface without departing from the spirit and principles of the present invention.

Referring to FIG. 14, two charging cables 124 run parallel down the side of the charger housing 112, while one charging cable 124 runs along the end of the housing 112. The proximal end 128 of each cable 124 is attached to the charger housing 112 and, in use, the cables 124 pivot out and away from the proximal ends 128, as shown in FIG. 9.

Figure 13:
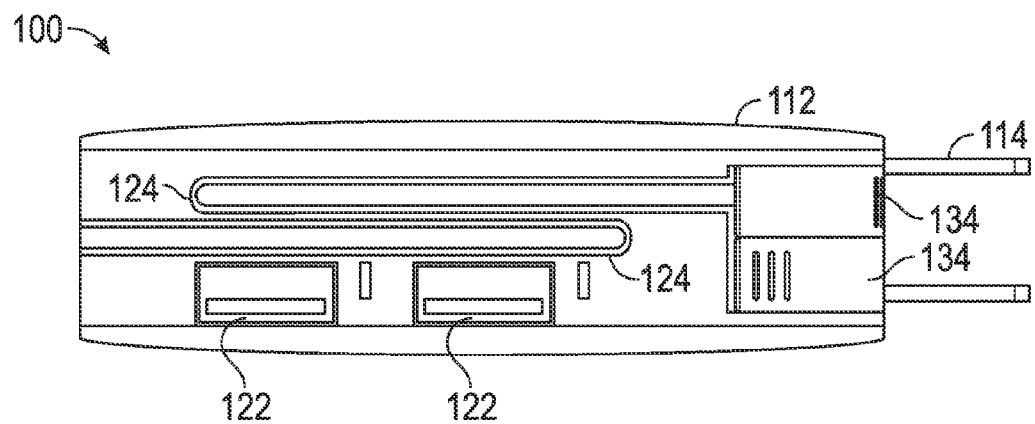
FIG. 13 shows an opposing planar end view of the portable power charger of FIG. 7.

A power charger in accordance with the present invention can also be connected to one or more electronic devices for recharging from the internal battery of the charger 100 or directly from an external power source via the portable charger 100 without using the power output connection interfaces provided in the charger housing 112. In preferred embodiments, at least one electronic device can be connected to the charger 100 via a power output connection port 122 provided on the charger housing 112, for example, using a connector cable inserted into the output port 122. As illustrated in FIGS. 8 and 13, the charger housing 112 includes two output ports 122 in the form of standard USB female connection ports. A connector cable inserted into one of these ports 122 can further be combined with an adapter unit to interface with various charging interfaces used on electronic devices, including for example a USB interface, a mini-USB interface, a micro-USB interface, an AC/DC interface, and the like. Such an output adapter unit can comprise interchangeable parts, each adaptable to a different type of interface, or alternatively, the portable power charger 100 can be adapted for use with an adapter comprising multiple different interfaces on the same part—e.g., a squid connector with multiple connectors.

Though two USB ports 122 are illustrated on the end of the charger housing 112, the present invention can use more or fewer ports without departing from the spirit and principles of the present invention. For example, the connection port provided on the car charger interface 116 (shown in FIG. 15) may also be used as a connection output, input, or both. Additionally, though the USB ports 122 are preferably intended as power output connection ports, the portable power charger 100 can be provided with any combination of input and output ports as needed, or further, utilize two-way charging interfaces to increase the versatility of the portable charger 100 such that a single port can be used to either recharge the internal battery of the charger, or charge electronic devices connected to the charger 100 from the internal battery via the port, or even charge such electronic devices while recharging the internal battery where the electronic devices and an external power source are connected to the charger at the same time via a single power connection port 122.

Referring to FIG. 12, the portable power charger 100 also includes a power indicator means 144 that will indicate not only that an electrical current is being supplied to an electronic device connected to the power output connector interface, but also the remaining capacity of the internal rechargeable battery unit in the power charger 100. For example, in an embodiment of the present invention, the power indicator means 144 comprises a series of lights, but can include more or fewer lights without departing from the principles and spirit of the present invention. When the battery is at full capacity or near full capacity, a "full" light—designated by an "F"—will be lit up. As the battery power decreases, the lights will correspondingly adjust as the power is used. For example, when the battery is approximately half-charger, then an associated "½" light will be lit up. If there is no capacity left in the internal battery, a light corresponding to an "empty" indication—designated by an "E"—will be lit up.

Figure 18:
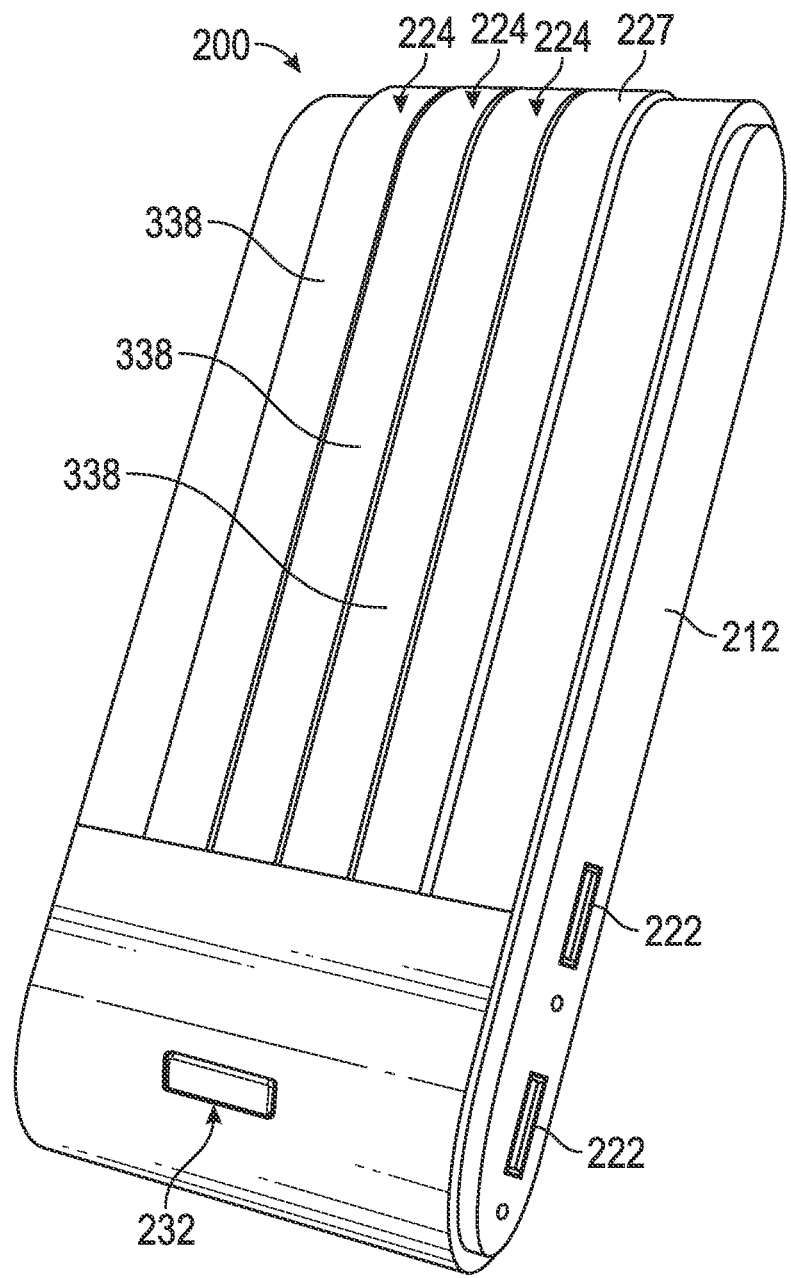
FIG. 18 shows a front perspective view of a portable power charger in accordance with a fourth embodiment of the present invention.
Figure 19:
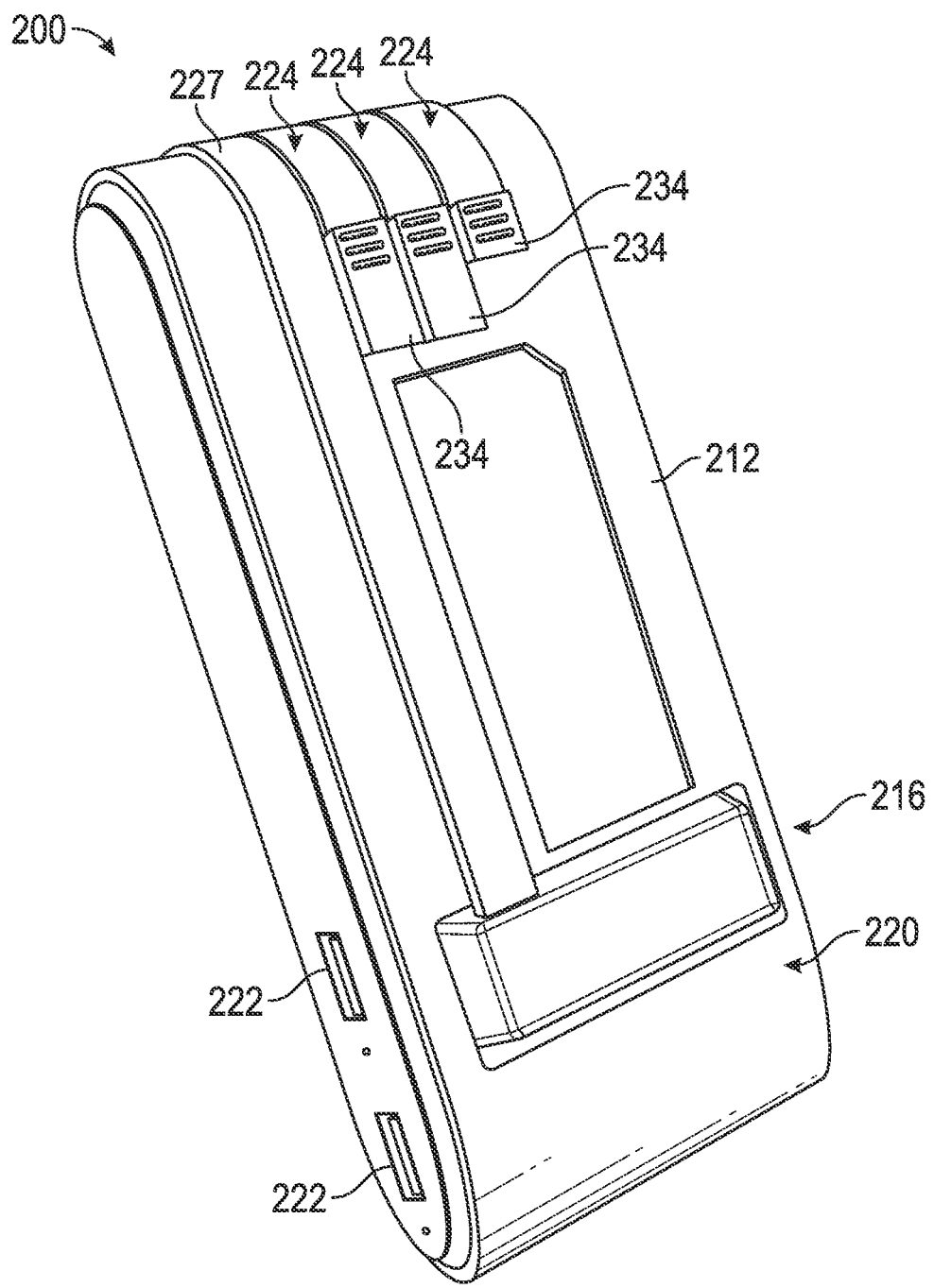
FIG. 19 shows a rear perspective view of the portable power charger of FIG. 18.

An alternate embodiment of a portable power charger in accordance with the present invention is shown in FIGS. 18-25, and generally designated as reference numeral 200. Referring to FIG. 18, a power charger 200 comprises a charger housing 212 having two connection ports 222 provided thereon and a power control interface 232 for controlling operation of the charger 200. Referring to FIG. 19, the charger 200 also comprises three power output connection interfaces 236 attached to the charger housing 212 by respective flat attachment ribbons 238 wrapped around the charger housing 212. The heads 234 of each output connection cable 224 is stored within a respective storage cavity 242 when not in use. As illustrated, the output connection cables 224 are parallelly arranged around the charger housing 212 when not in use. Each output connection interface 236 can be individually removed from its storage cavity 242 and flexed away from the housing 212 for use to connect to an electronic device in need of recharging.

Figure 22:
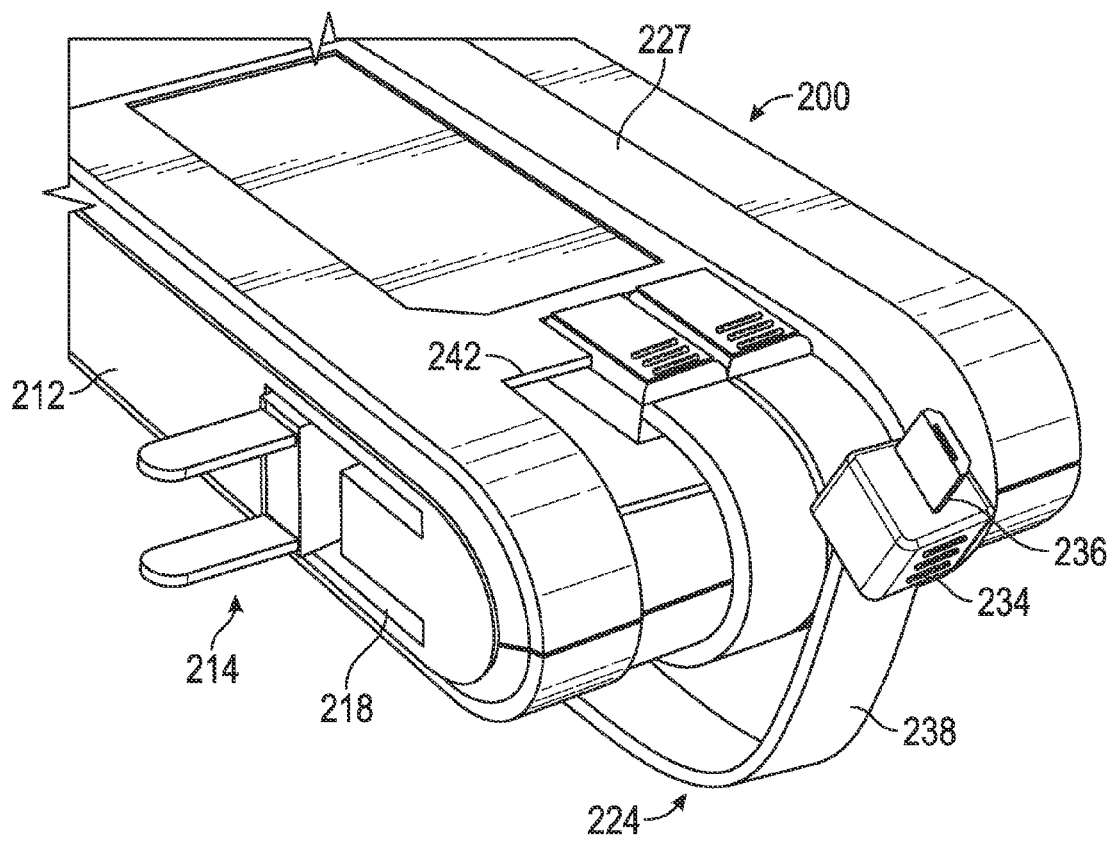
FIG. 22 shows a partial perspective rear view of the portable power charger of FIG. 18 with a power output connection interface extended from the charger housing for use.
Figure 23A:
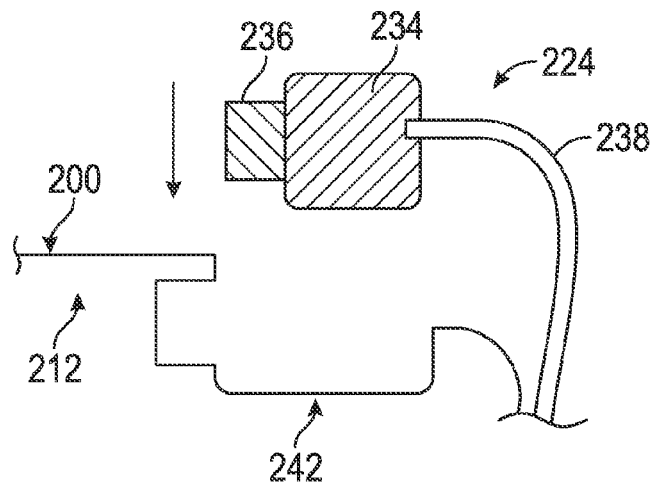
FIGS. 23a-23c illustrate steps for storing the power output connection interface of FIG. 22 in its storage cavity on the charger housing for the portable power charger of FIG. 18.
Figure 23B:
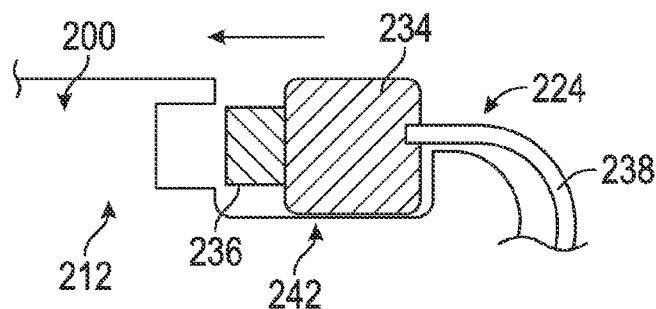
Figure 23C:
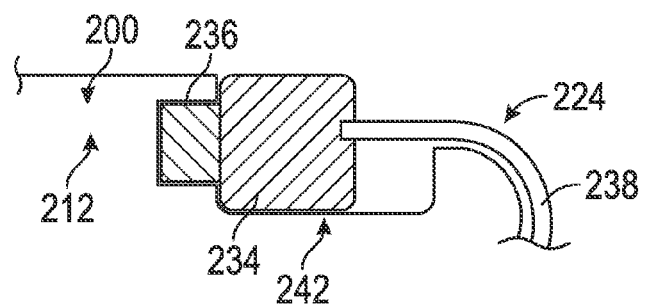

Referring to FIGS. 18-21, the charger 200 is illustrated with all of the interfaces stored within the housing 212. For comparison, FIG. 22 shows the charger 200 with one of the output connection interfaces 236 removed and extended away from the charger housing 212 for use. Each output connection interface 224 comprises a connector head 234 attached to the distal end 230 of the attachment ribbon 236. FIGS. 23a-23c illustrate how the connector head 234 can be moved into and secured within a storage cavity 242. For example, FIG. 23a shows movement of the connector head 234 into the cavity 242 from a use condition. FIG. 23b shows sliding movement of the connector head 234 further into the cavity 242 to protect the interface 236 during non-use conditions. Preferably, the connector head 234 is snap fitted into the cavity 242—which as shown, has complementary shape to the connector head 234 and interface 236—where is can be securely stored until needed, as shown in FIG. 23c. Preferably, the size of the cavity 242 is slightly larger than the size of the connector head 234 with interface 236 to facilitate movement of the interface 236 into and out of the cavity 242. When the connector head 234 is snapped into its storage position (as shown in FIG. 23c), the attachment ribbon 238 will cover the extra space of the cavity 242, as partially shown in FIG. 22, to prevent contamination or accidental snagging of the ribbons.

Figure 25A:
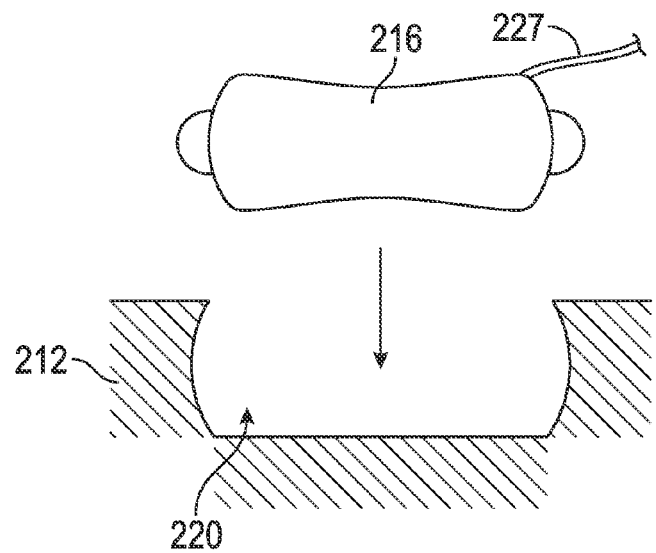
FIGS. 25a-25c illustrate steps for storing the car charger interface of FIG. 24 in its storage cavity on the charger housing for the portable power charger of FIG. 18.
Figure 25B:
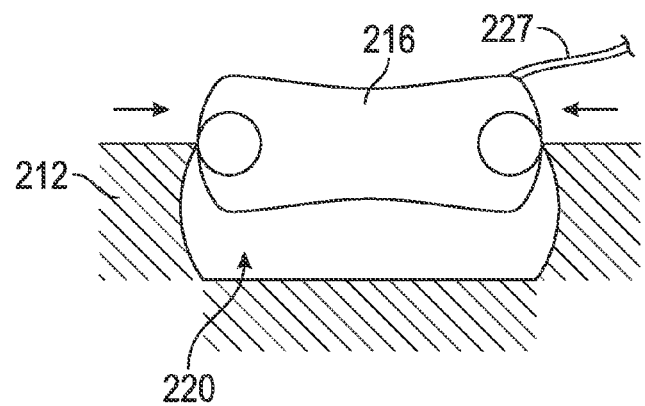
Figure 25C:
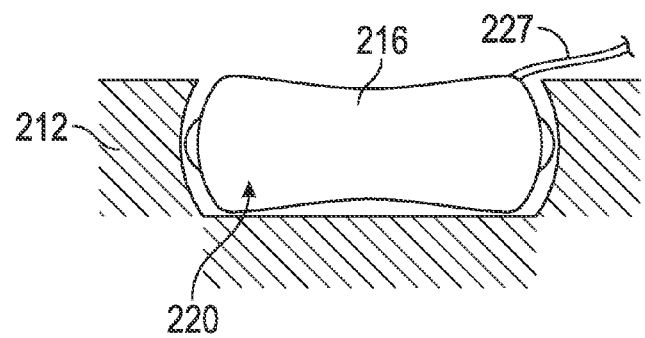

Referring to FIGS. 19 and 24, the charger 200 also includes power input connection interfaces in the form of a DC car charger interface 216 that is likewise connected to the charger housing 212 using a flat attachment ribbon 238 that runs parallel to the ribbons of the power input connection interfaces described above. The car charger interface 216 is similarly stored within a storage cavity formed in the charger housing 112 when not in use. When needed for connecting the charger 200 to a car charger socket to recharge the internal battery of the charger 200, the car charger interface 216 can be removed from its storage cavity 220 and extended away from the charger 200 for use, as shown in FIG. 24. The ribbon 238 can be flexible to facilitate use of the car charger interface 116, but also sufficiently rigid to easily return the interface 236 back to its cavity 242 when it is no longer needed and keep it tight to the charger housing 112 in line with the other attachment ribbons when not in use. As shown in FIGS. 25a-25c, the car charger interface 216 is provided with spring-loaded pawls to help keep the interface secured within its storage cavity 220 when not needed.

Referring to FIG. 20, the charger 200 also includes another power input connection interface in the form of an AC wall plug 214 that is pivotally connected to the charger housing 212. The plug 214 can be pivoted out and away from the charger housing 212, as shown in FIG. 22, for use—i.e., to connect the charger 200 with a wall socket to recharge the internal battery unit of the charger 200. When the plug 214 is not needed, it can be pivoted back into its storage cavity 218 and preferably contained within the footprint of the charger housing 212 when so stored, as shown in FIG. 20.

The charger 200 permits multiple power output connection interfaces to be used at the same time, and also permits electronic devices to be connected to the charger via power output connection interfaces even while the charger 200 is connected to an external power source—for example, either using the wall plug interface 214 or the car charger interface 216.

Figure 26:
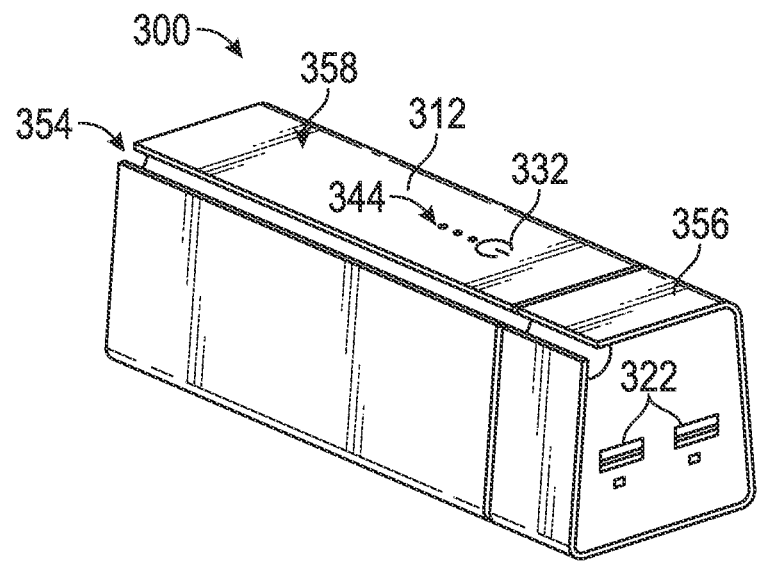
FIG. 26 shows a front perspective view of a portable power charger in accordance with a fifth embodiment of the present invention.
Figure 27:
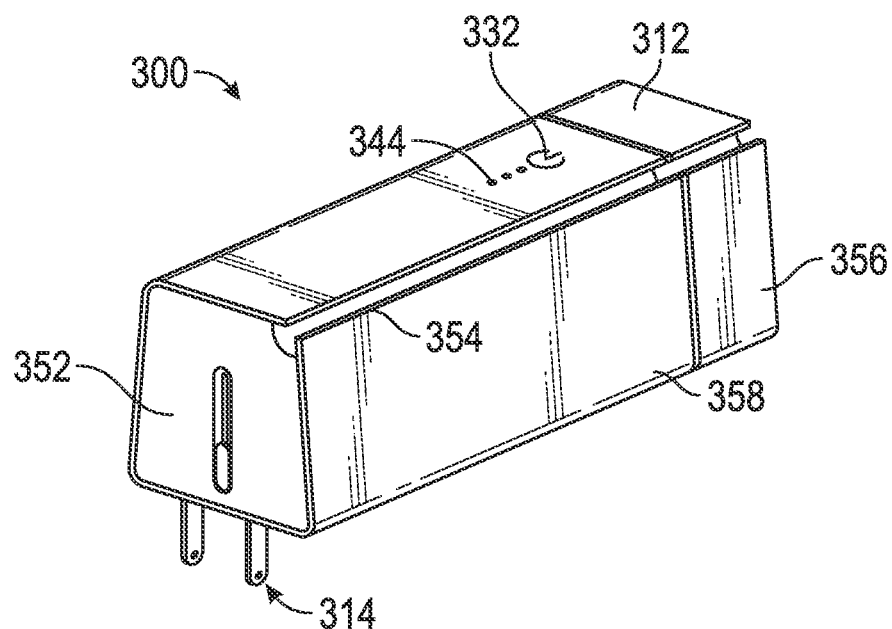
FIG. 27 shows an alternate front perspective view of the portable power charger of FIG. 26 with a wall plug interface extended from the charger housing.
Figure 28:
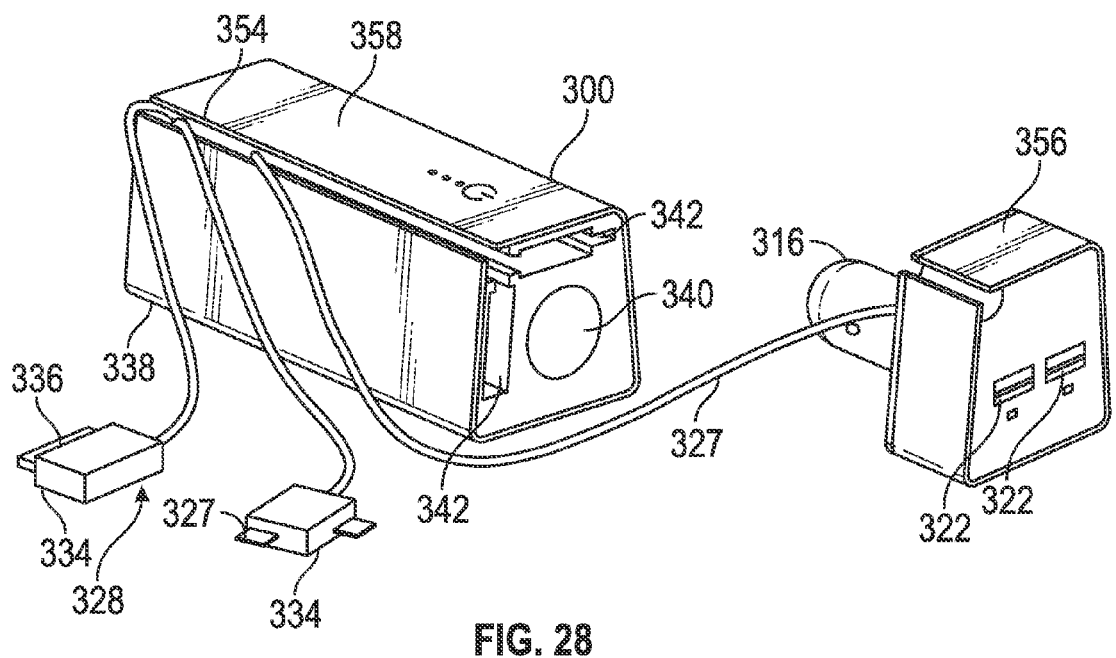
FIG. 28 shows a front perspective view of the portable power charger of FIG. 26 with power output and input connection interfaces removed from the charger housing for use.

Still another embodiment of a portable power charger in accordance with the present invention is illustrated in FIGS. 26-28 and generally designated as reference numeral 300. As shown, the charger 300 includes a charger housing 312 with a generally rectangular tubular shape. No connection interfaces—either input or output—are exposed. Two power connection ports 322 are provided on the end face of the housing 312 and a power control interface 332 is provided on a side face alongside power indicator means 344. A power input connection interface in the form of an AC wall plug 314 is contained within the charger housing 312 and can be extended from the housing 312 for use and retracted within the housing 312 for storage—for example, using a slide switch 352 provided on an opposing end face of the charger housing 312. The slide switch 352 and the plug interface 314 in its extended condition are more clearly illustrated in FIG. 27.

Referring back to FIG. 26, the charger housing 312 has a channel 354 running along the length of the housing 312. This channel 354 is used to store charging cables for power input and output connection interfaces stored within the charger housing 312, as described in more detail below. Notably, the charge housing 312 includes a cap 356 that is removable from a main body portion 358 of the charger 300. When removed, a power input connection interface in the form of a DC car charger interface 316 is exposed on the backside of the cap 356, as shown in FIG. 28. Removal of the cap 356 also exposes power output connection cables 324—for example, a first connector head 334a having an Apple 30-pin interface 336 attached to the distal end of a first charging cord portion 338*a* and a second connector head 334*b* having both a micro-USB interface 336*b* and an Apple Lightning™ interface 336*c* attached to the distal end of a second charging cord portion 338*b*. The cap 356 as well as the power output connection cables 324*a* and 324*b* are connected to the main body 358 of the charger 300 by the cord portions 338—the proximal ends 328 of each cable 324 is connected to the charger housing 312; the distal ends 330 of each cable 324 is connected to a respective interface or connector head 334.

As shown in FIG. 28, the main body 358 of the charger housing 312 includes storage cavities 342 for each of the head portions 334 and interfaces 336. For example, the car charger interface 316 includes a generally cylindrical portion extending from the backside of the cap 356. This portion engages a car charger socket in accordance with know operation of car chargers. In any event, when the car charger interface 316 of the charger 300 is not needed, it can be received within a complementary shaped cylindrical opening 320 formed in the main body 358 of the charger housing 312, as illustrated in FIG. 28. Similar cavities 342 are provided for each of the power output connection interfaces. The connector heads 334 for each interface can be stored within a respective cavity 342 when not in use. As noted, the charging cables 324 are run within the channel 354 formed in the charger housing 312 for storage and are kept hidden when not in use. As a result, the charger 300 can maintain a smooth, small and tight shape and form.

In use of a particular power output connection interface, the cap 356 can be removed to expose the interface 336, which can then be removed from its storage cavity 342 and extended away from the charger housing 312. When the interface 336 is connected to an electronic device for recharging, the charging cable 324 extends out of the channel 354. At this time, the cap 356 can be placed back on the main body 358, if desired. Additionally, the charger 300 permits multiple power output connection interfaces to be used at the same time, and also permits electronic devices to be connected to the charger 300 via power output connection interfaces even while the charger 300 is connected to an external power source—for example, either using the wall plug interface 314 or the car charger interface 316.

Figure 29:
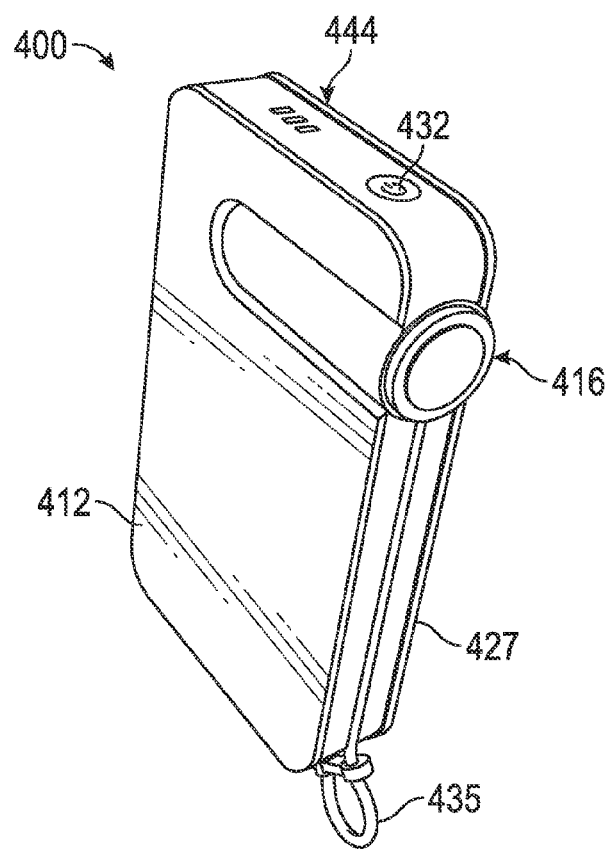
FIG. 29 shows a front right perspective view of a portable power charger in accordance with a sixth embodiment of the present invention.
Figure 30:
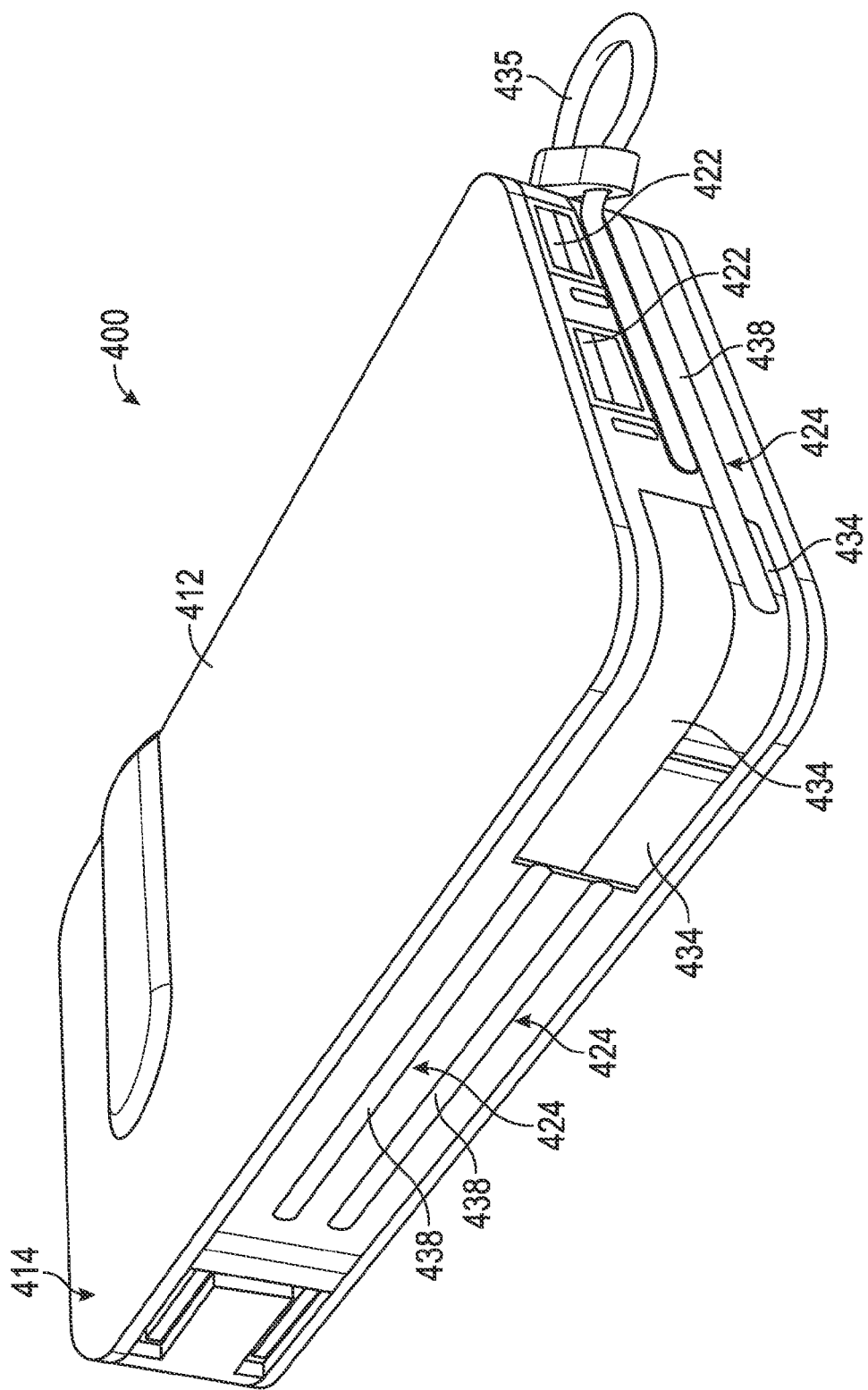
FIG. 30 shows a front left perspective view of the portable power charger of FIG. 29.
Figure 31:
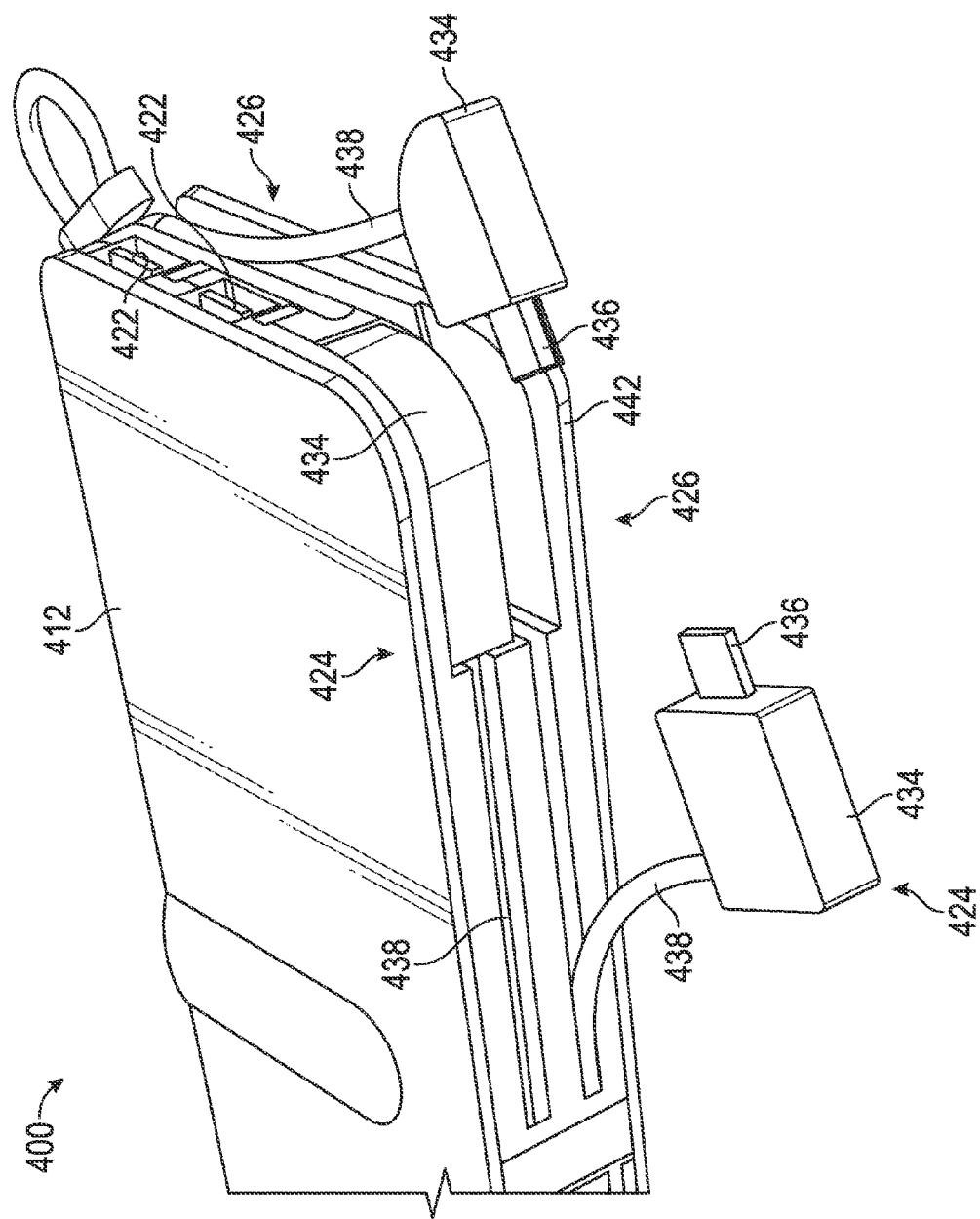
FIG. 31 shows a front left perspective view of the portable power charger of FIG. 29 with power output connection interfaces removed from the charger housing for use.
Figure 32:
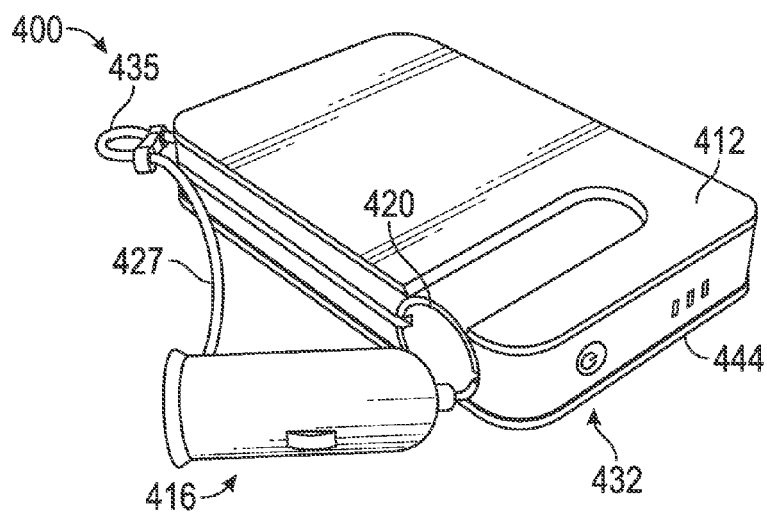
FIG. 32 shows a front right perspective view of the portable power charger of FIG. 29 with a car charger interface extended from the charger housing for use.
Figure 33:
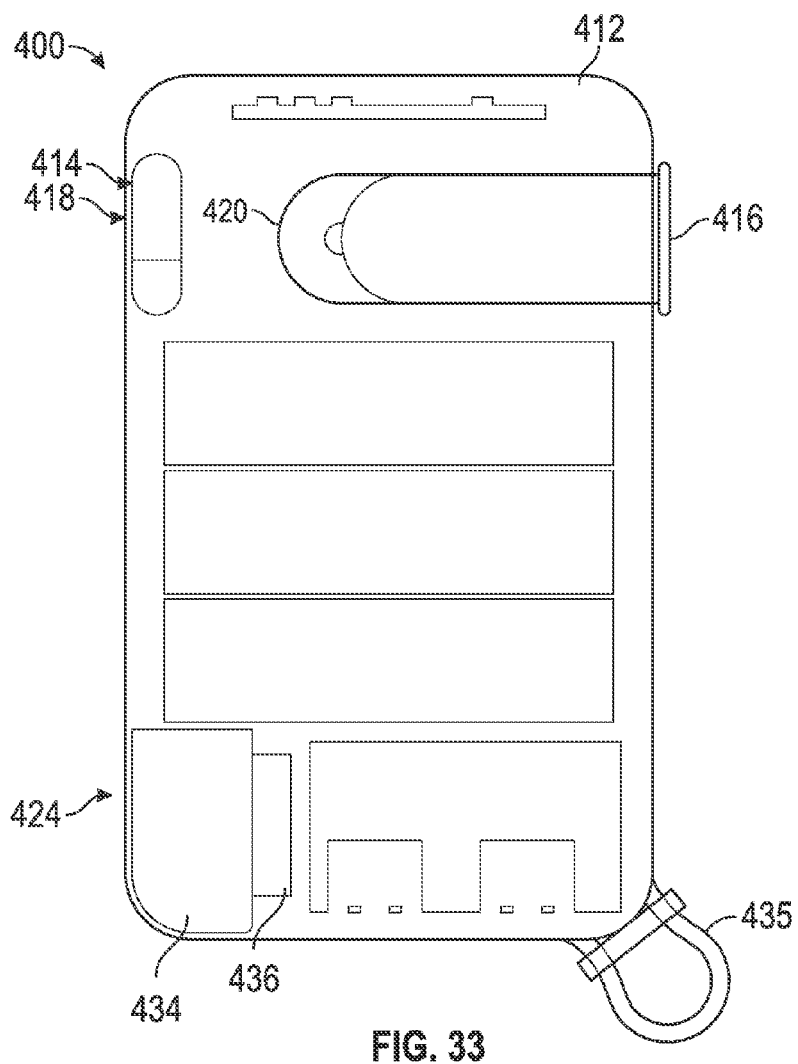
FIG. 33 shows a cross-sectional planar front view of the portable power charger of FIG. 29.

Another embodiment of the portable power charger in accordance with the present invention is illustrated in FIGS. 29-33 and generally designated as reference numeral 400. As shown, the power charger 400 comprises power connection ports 422, a power control interface 432, a power indicator means 444, power input connection interfaces, and power output connection interfaces, similar to other embodiments shown and described herein. Indeed, the charger 400 illustrated in FIG. 29 is similar in many regards to the design illustrated in FIGS. 7-15, and more particularly includes three power output connection cables 424 storable within respective retracted positions within storage cavities 426 formed into the charger housing 412. An AC wall plug interface 414 and a DC car charger interface 416 are also provided. As shown in FIGS. 29 and 32, the car charger interface 416 is stored within a cylindrically shaped storage cavity 420, into which the interface 416 is inserted lengthwise. A cross-sectional view of the charger 400, as illustrated in FIG. 33, illustrates the relational positioning of the input and output connection interfaces, as well as the internal battery unit (in the form of three batteries in series) and a motherboard containing the controller and processing unit of the charger 400.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable charger unit for recharging at least one electronic device having a rechargeable internal battery, said portable charger unit comprising:
    a charger housing internally storing a rechargeable battery;
    at least one power input connection interface connected to the charger housing for movement between an extended position where said at least one power input connection interface extends away from the charger housing for use and a retracted position for storage of said at least one power input connection interface within the charger housing, said at least one power input connection interface being operatively connected to the internal battery for providing an electrical charge from an external power source to the charger unit when said at least one power input connection interface is operatively engaged with said power source and for recharging the internal battery when the charger unit is connected to said power source in said manner; and
    a plurality of power output connection interfaces operatively connected to the internal battery for providing an electrical charge from the internal battery to respective electronic devices when said devices are connected to the charger unit via the power output connection interfaces,
    wherein the plurality of power output connection interfaces comprises a plurality of connector cables attached to the charger housing, each connector cable comprising:
        a proximal end attached to the charger housing,
        a distal end having an output connection interface adapted for engagement with an electronic device; and
        an intermediate portion extending between said proximal and distal ends of said connector cable,
    wherein at least the output connection interface of each of said plurality of connector cables is storable within a storage cavity formed in the charger housing so that said output connection interfaces are contained within the general footprint of the charger housing when not in use and are removable from said cavities to an extended position for use to connect with an electronic device,
    wherein at least two of the output connection interfaces are stored within a common cavity formed within the charger housing and are disposed in respective storage positions within said cavity without interfering with movement of the other output connection interface from the cavity to its extended position for use.

2. The portable charger unit according to claim 1, wherein the at least one power input connection interface, in its retracted position, is disposed within a cavity formed in the charger housing so that said at least one power input connection interface is contained within the general footprint of the charger housing when not in use.

3. The portable charger unit according to claim 1, wherein said at least one power input connection interface comprises one of a wall plug interface operatively connected to the charger housing and configured for engagement with a wall socket, and a car charger interface operatively connected to the charger housing and configured for engagement with a car charger socket.

4. The portable charger unit according to claim 1, wherein said at least one power input interface comprises:
- a wall plug interface operatively connected to the charger housing and configured for engagement with a wall socket; and
- a car charger interface operatively connected to the charger housing and configured for engagement with a car charger socket.

5. The portable charger unit according to claim 4, wherein both the wall plug interface and the car charger interface are pivotable to respective retracted positions and disposed within the general footprint of the charger housing when in said retracted positions.

6. The portable charger unit according to claim 1, wherein each of the plurality of power output connection interfaces comprises one of a power connection port and a connector cable operatively connected to the internal battery.

7. A portable charger unit for recharging at least one electronic device having a rechargeable internal battery, said portable charger unit comprising:
- a charger housing internally storing a rechargeable battery;
- a wall plug interface configured for engagement with a wall socket and being operatively connected to the internal battery for providing an electrical charge from said wall socket to the charger unit when said wall plug interface is operatively engaged with said wall socket and for recharging the internal battery when the charger unit is connected to said wall socket in said manner, said wall plug interface being pivotably connected to the charger housing for movement between an extended position where said wall plug interface projects outwardly away from the charger housing for use and a retracted position for storage of said wall plug interface within the charger housing;
- a car charger interface configured for engagement with a car charger socket and being operatively connected to the internal battery for providing an electrical charge from said car charger socket to the charger unit when said car charger interface is operatively engaged with said car charger socket and for recharging the internal battery when the charger unit is connected to said car charger socket in said manner, said car charger interface being removably connected to the charger housing for movement between an extended position where said car charger interface extends away from the charger housing for use and a retracted position for storage of said car charger interface within the charger housing; and
- a plurality of power output connection interfaces operatively connected to the internal battery for providing an electrical charge from the internal battery to respective electronic devices when said devices are connected to the charger unit via the power output connection interfaces,
- wherein the wall plug interface and the car charger interface, in their respective retracted positions, are each disposed within a storage cavity formed in the charger housing so that said interfaces are each contained within the general footprint of the charger housing when not in use, and the car charger interface is connected to the charger housing by a cable connected between the car charger interface and the charger housing permitting movement of the car charger interface between its retracted position where it is stored within a storage cavity in the charger housing and its extended position where it extends away from the charger housing for engagement with a car charger socket while remaining connected to the charger unit via said cable.

8. The portable charger unit according to claim 7, wherein each of the plurality of power output connection interfaces comprises one of a power connection port and a connector cable operatively connected to the internal battery.

9. The portable charger unit according to claim 7, wherein the plurality of power output connection interfaces comprises a plurality of connector cables attached to the charger housing, each connector cable comprising:
- a proximal end attached to the charger housing,
- a distal end having an output connection interface adapted for engagement with an electronic device; and
- an intermediate portion extending between said proximal and distal ends of said connector cable.

10. The portable charger unit according to claim 9, wherein at least the output connection interface of each of said plurality of connector cables is storable within a storage cavity formed in the charger housing so that said output connection interfaces are contained within the general footprint of the charger housing when not in use.

11. The portable charger unit according to claim 10, wherein at least two of the output connection interfaces are stored within a common cavity formed within the charger housing and are disposed in respective storage positions within said cavity without interfering with movement of the other output connection interface from the cavity to an extended position for use.

12. A portable charger unit for recharging at least one electronic device having a rechargeable internal battery, said portable charger unit comprising:
- a charger housing internally storing a rechargeable battery;
- at least one power input connection interface connected to the charger housing for movement between an extended position where said at least one power input connection interface extends away from the charger housing for use and a retracted position for storage of said at least one power input connection interface within the charger housing, said at least one power input connection interface being operatively connected to the internal battery for providing an electrical charge from an external power source to the charger unit when said at least one power input connection interface is operatively engaged with said power source and for recharging the internal battery when the charger unit is connected to said power source in said manner;
- at least one power connection port operatively connected to the internal battery; and
- a plurality of power output connector cables operatively connected to the internal battery for providing an electrical charge from the internal battery to respective electronic devices when said devices are connected to the charger unit via the power output connector cables, wherein each connector cable comprises:
- a proximal end attached to the charger housing,
- a distal end having an output connection interface adapted for engagement with an electronic device; and
- an intermediate portion extending between said proximal and distal ends of said connector cable,
- wherein at least the output connection interface of each of said plurality of connector cables is storable within a storage cavity formed in the charger housing so that said output connection interfaces are contained within the general footprint of the charger housing when not in use, and at least two of the output connection interfaces are stored within a common cavity formed within the charger housing and are disposed in respective storage positions within said cavity without interfering with movement of the other output connection interface from the cavity to an extended position for use.

13. The portable charger unit according to claim 12, wherein said at least one power input connection interface comprises at least one of a wall plug interface operatively connected to the charger housing and configured for engagement with a wall socket, and a car charger interface operatively connected to the charger housing and configured for engagement with a car charger socket.

14. The portable charger unit according to claim 12, wherein the at least one power connection port is capable of acting as a power input and a power output depending on what is connected to the charger unit via said power connection port;
    wherein said power connection port acts as a power input when the power connection port is connected to an external power source that provides an electrical charge to the charger unit, and said charge is used for recharging the internal battery when the charger unit is connected to said power source via the power connection port;
    wherein said power connection port acts as a power output when the power connection port is connected to at least one electronic device, and a charge is provided from the internal battery of the charger unit to the electronic device to recharge the internal battery of said electronic device when said electronic device is connected to the charger unit via the power connection port.

\* \* \* \* \*